United States Patent [19]

Nakamura et al.

[11] Patent Number: 5,202,672
[45] Date of Patent: Apr. 13, 1993

[54] OBJECT DISPLAY SYSTEM

[75] Inventors: Shigeichi Nakamura; Toru Ogawa, both of Tokyo; Makoto Inoue, Yokohama; Seiichi Sato, Tokyo, all of Japan

[73] Assignee: Namco Ltd., Tokyo, Japan

[21] Appl. No.: 882,258

[22] Filed: May 8, 1992

Related U.S. Application Data

[63] Continuation of Ser. No. 291,156, Dec. 28, 1988, abandoned.

[30] Foreign Application Priority Data

Dec. 30, 1987 [JP] Japan .................. 62-335708

[51] Int. Cl.$^5$ .............................................. G09G 5/36
[52] U.S. Cl. ................................. 340/747; 340/750; 340/799
[58] Field of Search ............... 340/750, 799, 703, 731, 340/747, 745, 734, 721, 723, 728; 273/85 G, DIG. 28

[56] References Cited

U.S. PATENT DOCUMENTS

| | | | |
|---|---|---|---|
| 4,107,665 | 8/1978 | Mayer et al. | 340/747 |
| 4,116,444 | 9/1978 | Mayer et al. | 340/747 |
| 4,324,401 | 4/1982 | Stubben et al. | 340/750 |
| 4,445,114 | 4/1984 | Stubben | 340/734 |
| 4,528,636 | 7/1985 | Robinson | 340/803 |
| 4,754,966 | 7/1988 | Bottiau | 340/720 |

FOREIGN PATENT DOCUMENTS 0145046 6/1985 European Pat. Off. .
0194092 9/1986 European Pat. Off. .

Primary Examiner—Alvin E. Oberley
Assistant Examiner—Richard Hjerpe
Attorney, Agent, or Firm—Oliff & Berridge

[57] ABSTRACT

The invention provides an object display system for calculating a set of object data including object identification data, vertical display position data and horizontal display position data for each of objects to be displayed and displaying the image of that object on a raster display, based on the calculated object data, the object display system having a shape generator pre-registered with the image of each object as block information represented by binary pixel data which are representative of transparent and opaque sections of the image, said shape generator being adapted to output the binary pixel data corresponding to one horizontal scan in the block of the object as transparent or opaque data for each pixel. By the shape generator judging whether each of pixels is transparent or opaque, the system can have very decreased amount of data required to perform the judgement and be of the entire simplified structure with decreased cost. Furthermore, the above judgement can be performed more rapidly.

15 Claims, 22 Drawing Sheets

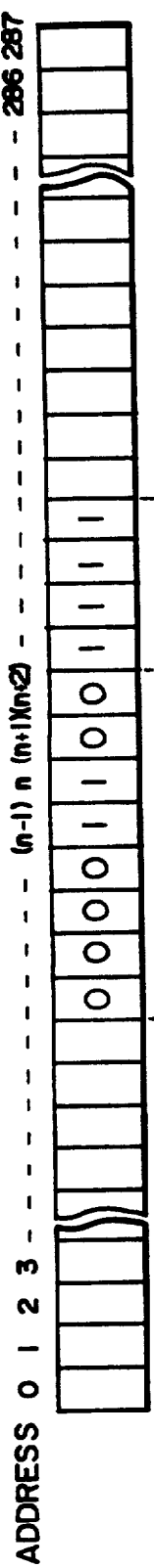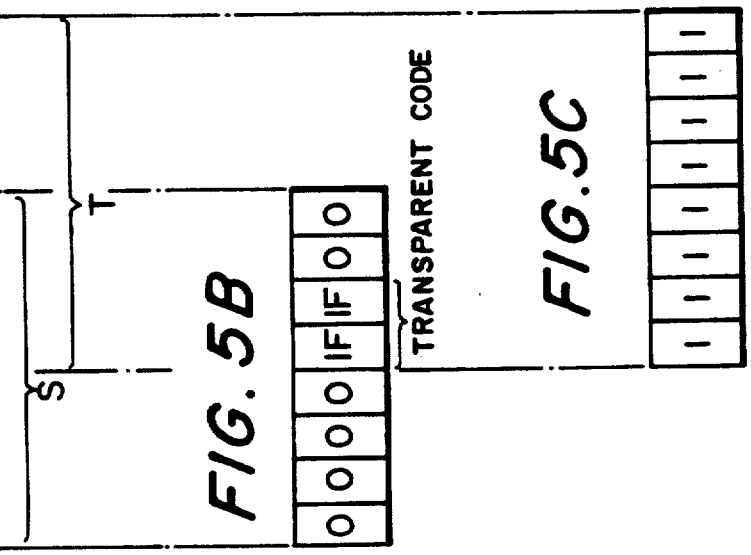
FIG. 5A
FIG. 5B
FIG. 5C

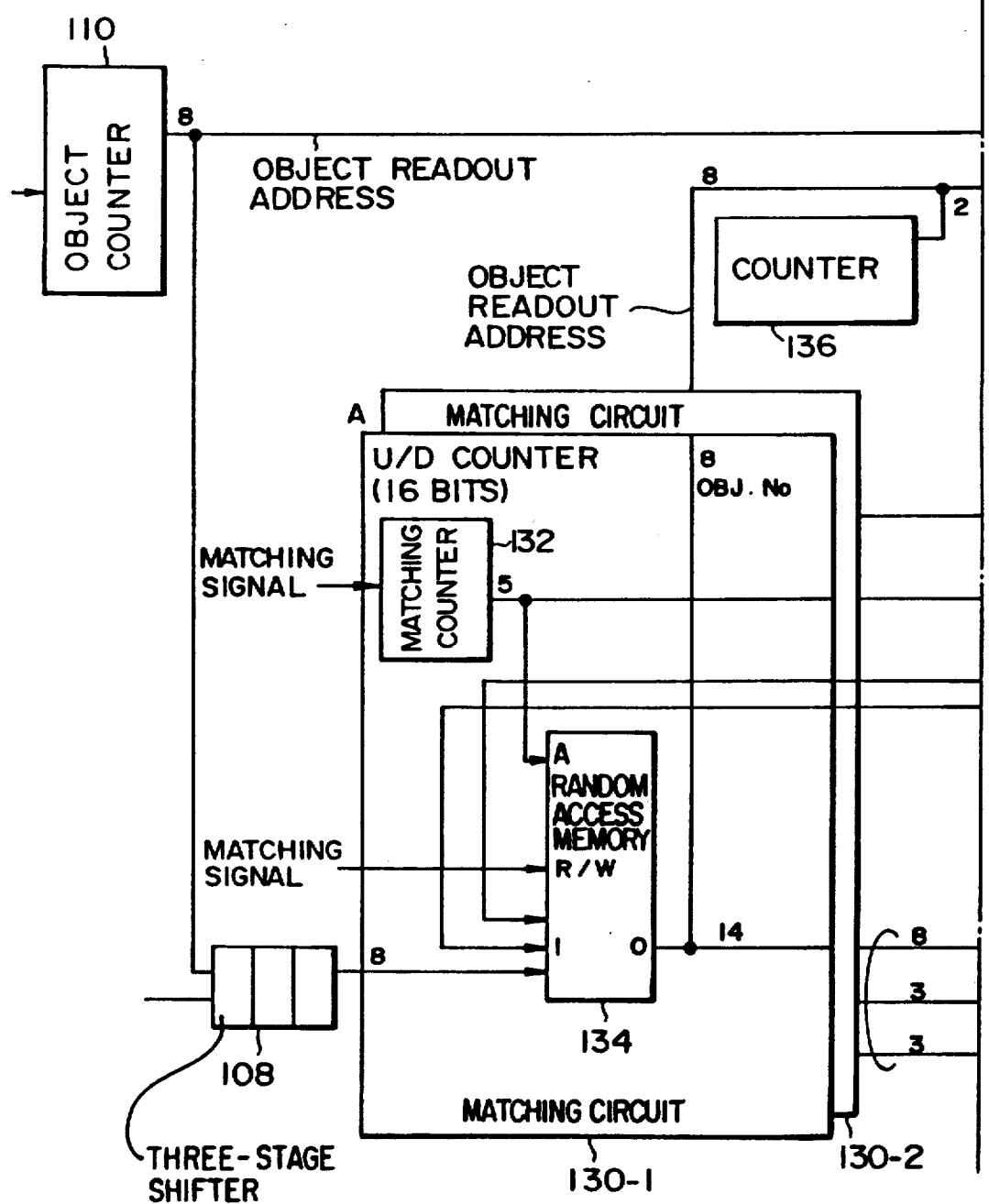

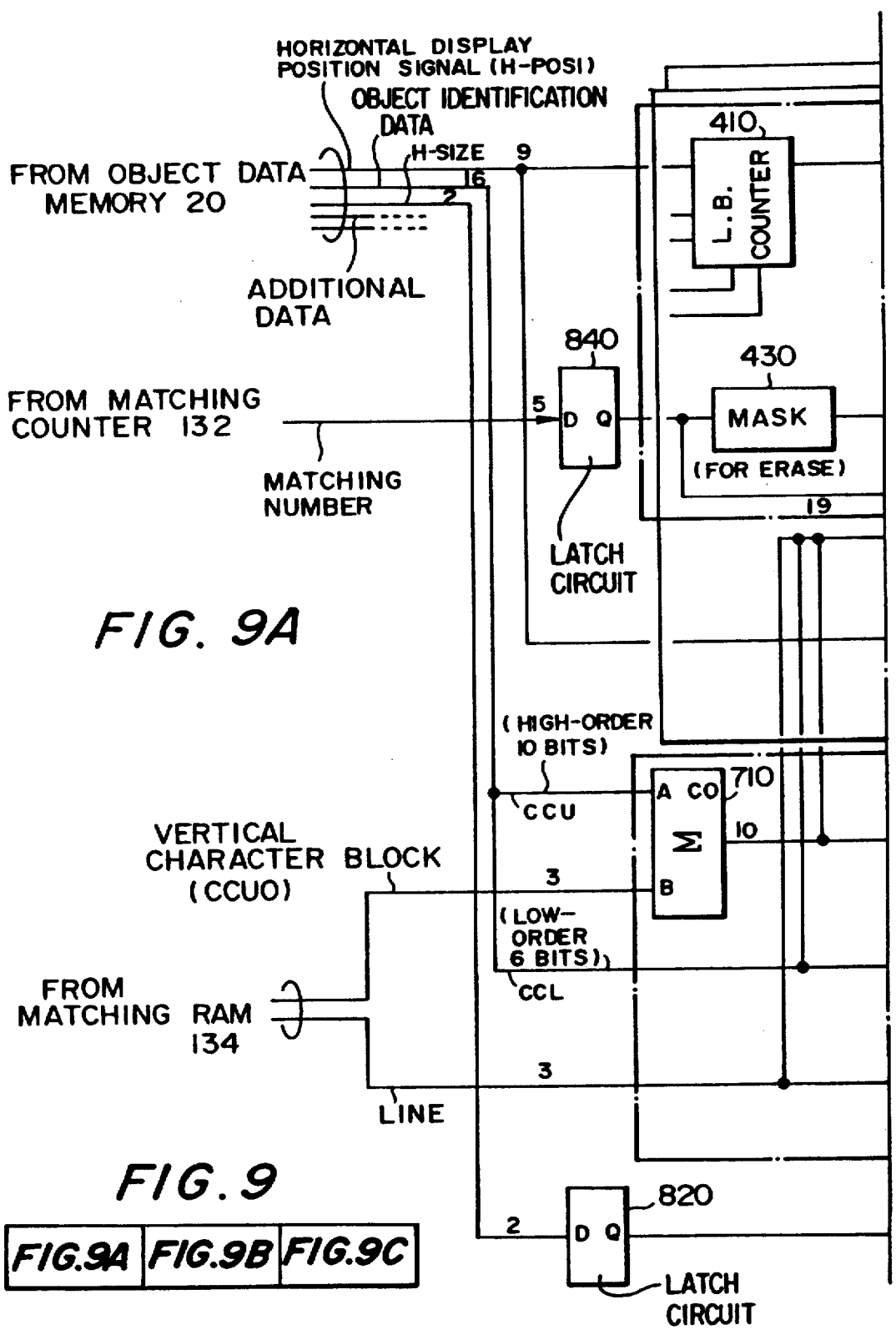

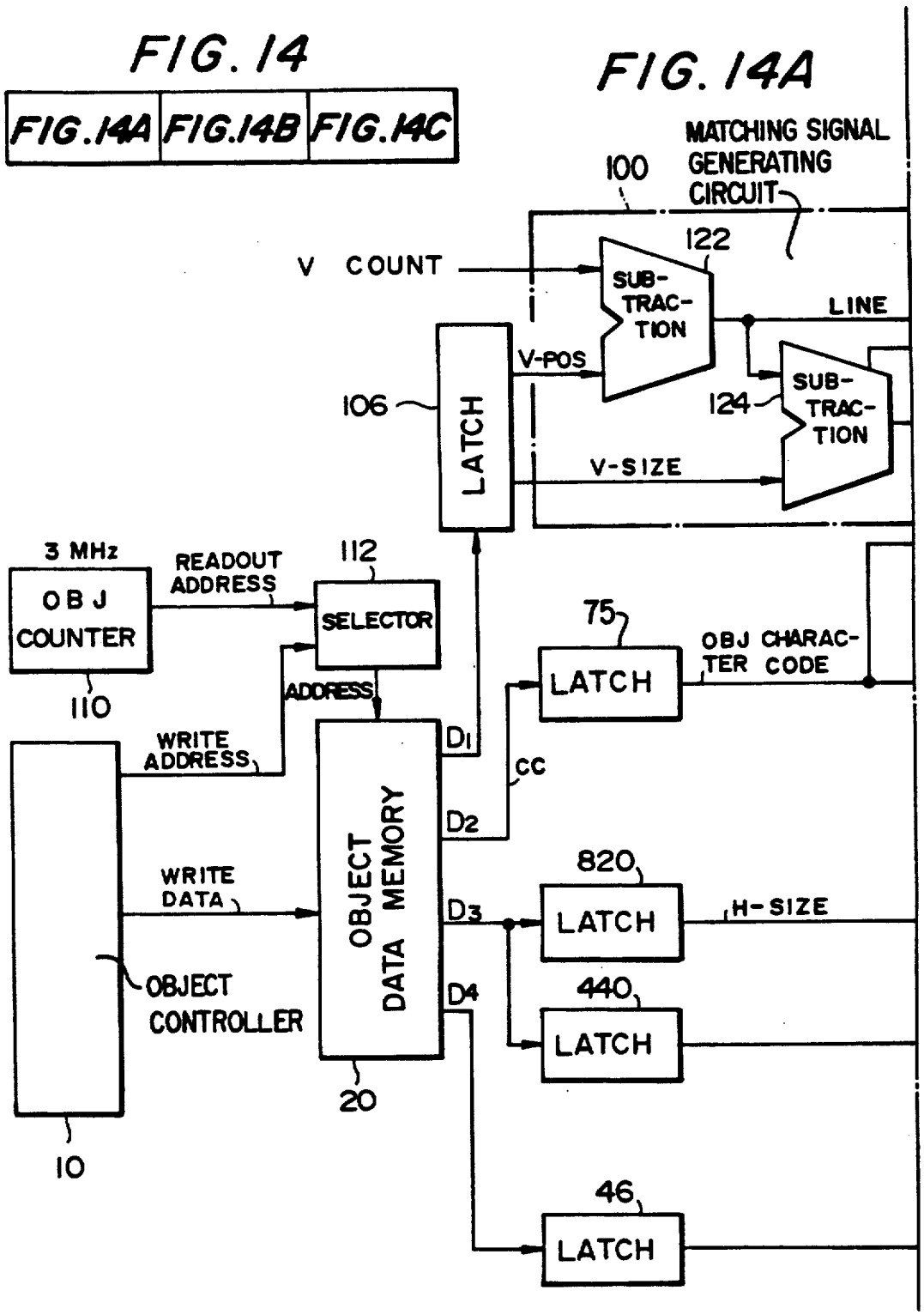

FIG. 16A PRIOR ART

|   |   |   |   |   |   |   |   |
|---|---|---|---|---|---|---|---|
| 0 | 0 | 0 | 0 | 0 | 0 | 0 | 0 |
| 0 | 0 | 0 | 1 | 1 | 0 | 0 | 0 |
| 0 | 0 | 1 | 1 | 1 | 1 | 0 | 0 |
| 0 | 1 | 1 | 1 | 1 | 1 | 1 | 0 |
| 1 | 1 | 1 | 2 | 2 | 1 | 1 | 1 |
| 1 | 1 | 1 | 2 | 2 | 1 | 1 | 1 |
| 0 | 1 | 1 | 1 | 1 | 1 | 1 | 0 |
| 0 | 0 | 1 | 1 | 1 | 1 | 0 | 0 |
| 0 | 0 | 0 | 1 | 1 | 0 | 0 | 0 |

P (TRANSPARENT SECTION)
X2
U (OPAQUE SECTION)

FIG. 16B

|   |   |   |   |   |   |   |   |
|---|---|---|---|---|---|---|---|
| 1 | 1 | 0 | 0 | 0 | 0 | 1 | 1 |
| 1 | 1 | 1 | 0 | 0 | 1 | 1 | 1 |
| 0 | 1 | 1 | 0 | 0 | 1 | 1 | 0 |
| 0 | 1 | 1 | 1 | 1 | 1 | 1 | 0 |
| 0 | 1 | 1 | 1 | 1 | 1 | 1 | 0 |
| 0 | 1 | 1 | 0 | 0 | 1 | 1 | 0 |
| 1 | 1 | 1 | 0 | 0 | 1 | 1 | 1 |
| 1 | 1 | 0 | 0 | 0 | 0 | 1 | 1 |
| 0 | 0 | 0 | 0 | 0 | 0 | 0 | 0 |

P
X1
U

OBJECT DISPLAY SYSTEM

This is a continuation of application Ser. No. 07/291,156 filed Dec. 28, 1988, now abandoned.

BACKGROUND OF INVENTION

1. Field of the Invention

The present invention relates to an object display system and particularly to an improved system wherein object data stored in an object display data memory and corresponding to one scene are read out and displayed on a raster display as an image.

2. Description of the Related Art

Object display systems are currently used in various simulators and other appliances. In video games which are recently spreading, an object display system is used to form game scenes corresponding to the respective states of game.

FIG. 15 shows a conventional object display system which is used in a video game.

The conventional object display system comprises an object controller 10 and an object data memory 20. The object controller 10 calculates object data for each of objects to be displayed on CRT by one scene, according to a preselected game program and external input signals. The object data for each object includes an object identification signal used to specify the displayed object, vertical and horizontal display position data representative of the position of the displayed object on the CRT and additional data. The object data calculated by the object controller 10 and corresponding to one scene are written and stored in the object data memory 20 at each time when said calculation has been completed.

The contents of the object data memory 20 are updated at each time when the calculated object data corresponding to one scene are outputted from the object controller 10.

In order to display the image of each object on the CRT in accordance with the object data stored in the object data memory 20 and corresponding to one scene, the data of an object to be displayed on the succeeding horizontal scan line of the CRT must be read out after each horizontal scan.

Thus, the conventional system comprises an object detecting and writing circuit 50 for detecting an object displayed on each horizontal scan line from the object data memory 20 in synchronism with each horizontal scan. The detected object data are then applied to a character generator 40, via a data bus, through a latch circuit 30 and at the same time to a line buffer 60.

The character generator 40 previously stores an object image representative of the shape and color of each object as a group of vertical and horizontal color pixel block data as shown in FIGS. 16A and 16B. Object identification data used to read out the corresponding object are set in each of the stored object images, that is, block data.

When the object identification data of an object and its vertical scan position signal (line number) in the block are inputted in the character generator 40, the object image thereof is read out for each line.

FIG. 11 shows a plurality of images stored in the character generator 40 with respect to the block data of objects. In this figure, the identification data of each of the objects includes column character codes and line character codes. In the preferred embodiment, the object data is set for the number of objects equal to 1024×64, which are specified by the column character codes equal to 1024 and the line character codes equal to 64.

As seen from FIG. 11, the block data of each object are represented by the total number of pixels equal to 64, which are defined by eight longitudinal addresses times eight transverse addresses. Pixel data of eight bits are assigned to each pixel.

Normally, the 8-bit pixel data assigned to each pixel are representative of color codes used to distinguish colors. In case where 8-bit pixel data are assigned to each pixel as shown in FIG. 11, the total number of color codes will be equal to $2^8 = 256$.

FIG. 12 shows the concept of a readout address for an object registered in the character generator 40. This readout address includes object identification data CC consisting of line character codes CCU and column character codes CCL, a line number and a dot number. The readout address is adapted to specify block data of the corresponding displayed object by the use of the line and column character codes; to specify a horizontal scan line within the block of the object by the use of the line number (vertical in-block scan position data); and to specify the address of the corresponding pixel displayed on the specified horizontal scan line by the use of the dot number.

By successively incrementing said dot number by eight bits, therefore, pixel data (8-bit pixel data) of the corresponding object is sequentially read out from the character generator 40 and then outputted to the line buffer 60 (FIG. 15). Such a procedure is repeated to write the pixel data of one or more objects to be displayed on one horizontal scan line in the line buffer 60.

The pixel data of the object(s) written in the line buffer 60 in synchronism with one horizontal scan on the CRT are then applied to a color signal circuit (not shown) through a multiplexer 70. The color signal circuit will then output the image signals of the corresponding object from the color signal circuit by each pixel.

However, the conventional object display system has the following problems which are highly desired to overcome in the art.

(A) First Problem

In the conventional system, it is possible that a plurality of objects are displayed as overlapped images. In such a case, one of the objects having its higher priority order must be written in the line buffer 60 at the overlapped area.

It is now assumed that two objects $X_1$ and $X_2$ each having transparent sections P (designated "0") and opaque sections U (designated numerals other than "0") as shown in FIG. 16 are overlapped to form a composite scene as shown in FIG. 17. In such a case, the object $X_1$ (e.g. forwardly displayed object) having its higher priority order must be written in an area wherein the two objects are displayed overlapped. However, if a portion of the object $X_1$ having its higher priority order includes transparent section(s) P, the other or backwardly displayed object will be viewed through the transparent section(s) of the forwardly displayed object.

When it is assumed that the composite scene shown in FIG. 17 is to be displayed, its scan line data will be written in the line buffer 60 such that pixel data of the object $X_1$ shown in FIG. 18 (B) are overlapped over pixel data of the object $X_2$ shown in FIG. 18 (A) to display the opaque sections of the object $X_2$ through the transparent sections P of the object $X_1$ overlapped thereover, as shown in FIG. 18 (C).

In order to perform such a writing operation, it is required to write the data of each object into the line buffer 60 while judging whether each of the pixels in that object is transparent or opaque. To this end, the conventional system judged whether or not each of the pixels is transparent, based on color codes being written in the line buffer 60.

The color codes are composed of data equal to eight or more bits. In the recent video games using many kinds of colors, particularly, there are frequently used color codes defined by eight or more bits. In order to utilize such color codes to judge whether each of the pixels is transparent or opaque, the system must take in and judge all the data of eight or more bits defining color codes. This means that the judgement cannot be performed rapidly.

In the conventional system, time required to judge whether each pixel is transparent or opaque intimately relates to the number of displayable objects on each horizontal scan line. If such a judgement is delayed, therefore, the number of objects displayed on one horizontal scan line is restricted.

In order to overcome such a problem and to judge whether each pixel is transparent or opaque in a more rapid manner, it can be considered that the system comprises gates corresponding in number to the number of bits defining the color codes and that the bit data from these gates are simultaneously logically processed to perform the aforementioned judgement. However, such a solution provides a very complicated circuit for judging whether each pixel is transparent or opaque, resulting in increased cost on manufacturing the entire system.

(B) Second Problem

In the conventional object display system, 16 bits are generally assigned to a storage area corresponding to one of pixels in the line buffer 60. To each of such storage areas, there are written data of each object which consists of 8-bit color codes used to distinguish colors, 5-bit pallet codes for specifying the kind of color pallets and 3-bit attribute codes representing the priority order of the object and the like.

There is thus created another problem that as the amount of information is being increased for each of the objects, the amount of data written in each storage area of the line buffer also increases, requiring a line buffer having its larger capacity.

In the recent video games, the number of colors for object is remarkably increased to increase the number of bits in color and pallet codes to be written in each of the pixels within the line buffer 60. In a video game using the great number of colors, therefore, it requires a line buffer having its increased capacity, resulting in increase of manufacturing cost.

(C) Third Problem

In the conventional object display system, further, display data such as color codes themselves for each object are written in the line buffer 60. If the amount of data to be written in the storage area of each of the pixels is to increase, the line buffer 60 must be replaced by another line buffer having its larger capacity. This leads to still another problem in that the line buffer 60 cannot be custom-chipped to make the entire system more inexpensive.

SUMMARY OF THE INVENTION

In view of the aforeman problems, it is an object of the present invention to provide an improved object display system which can overcome the first problem on writing the data of each object in the line buffer and which comprises a simplified circuit for more rapidly judging whether or not each of the pixels in that object is transparent, thereby enabling more objects to be displayed on each of the horizontal scan lines.

Another object is to provide an improved object display system which can overcome the second and third problems to use a line buffer having a necessary minimum capacity at all times independently of increase or decrease of data used to display an object and yet to provide a custom-chipped line buffer to decrease the manufacturing cost of the entire system, as required.

To this end, the first concept of the present invention provides an object display system for calculating a set of object data including object identification data, vertical display position data and horizontal display position data for each of objects to be displayed and displaying the image of that object on a raster display, based on the calculated object data, said object display system comprising:

an object data memory for storing the calculated object data corresponding to one scene;

an object detecting circuit for detecting the section of an object to be displayed on each of horizontal scan lines in the raster display in synchronism with said horizontal scan lines, based on the object data stored in said object data memory and calculating and outputting the vertical in-block scan position of the detected object;

a shape generator pre-registered with the image of each object as block information represented by binary pixel data which are representative of transparent and opaque sections of the image, said shape generator being adapted to output the binary pixel data corresponding to one horizontal scan in the block of the object as transparent or opaque data for each pixel, based on the object identification data and the vertical in-block scan position data;

an object memory for reading the data of each object detected by said object detecting circuit and for storing the data sequentially in predetermined storage areas; and a line buffer having a storage area corresponding to each pixel on the horizontal scan line, said line buffer being adapted to judge whether each of the pixels of the detected object is transparent or opaque in accordance with the output of said shape generator and to sequentially store the write addresses of the detected object to said object memory at the storage areas of said line buffer corresponding to the opaque sections of the image;

whereby the information of the detected object can be read out from said object memory and then provided to said character generator in synchronism with the horizontal scan, based on write address data stored in said line buffer for one horizontal scan line.

The second concept of the present invention provides an object display system for calculating a set of object data including object identification data, vertical display position data and horizontal display position data for each of the objects to be displayed and displaying the image of that object on a raster display, based on the calculated object data, said object display system comprising:

an object data memory for storing the calculated object data corresponding to one scene;

an object detecting circuit for detecting the section of an object to be displayed on each of horizontal scan lines in the raster display in synchronism with said horizontal scan lines, based on the object data stored in said object data memory and calculating and outputting the vertical in-block scan position of the detected object;

a shape generator pre-registered with the image of each object as block information represented by binary pixel data which are representative of transparent and opaque sections of the image, said shape generator being adapted to output the binary pixel data corresponding to one horizontal scan in the block of the object as transparent or opaque data of each pixel, based on the object identification data and the vertical in-block scan position data;

a character generator pre-registered with the image of each object as block information specifying the color of said image by a color code for each pixel, said character generator being adapted to output color code data corresponding to one horizontal scan in the block of the corresponding object for each pixel, based on the object identification data and said vertical in-block scan position data; and a line buffer having a storage area corresponding to each pixel on the horizontal scan line, said line buffer being adapted to judge whether each of the pixels of the detected object is transparent or opaque in accordance with the output of said shape generator and to sequentially store the write addresses of the detected object to said object memory at the storage areas of said line buffer corresponding to the opaque sections of the image;

whereby data stored in said line buffer for one horizontal scan can be read out as pixel data sequentially in synchronism with the horizontal scan.

The present invention will now be described in function.

(a) Common Function between the First and Second Concepts of the Present Invention Both the first and second concepts of the present invention can overcome the first problem of the prior art aforementioned.

When an object which is to be calculated in synchronism with the horizontal scan and to be displayed on a horizontal scan line is detected, binary pixel data corresponding to one horizontal scan within the block of the detected object is outputted from the shape generator as data representative of transparent or opaque in each of the pixels.

At the same time, the data of the detected object are stored in the line buffer at its storage area corresponding to the position in which the detected object is displayed. On this writing, the display system of the present invention judges, based on the binary pixel data from said shape generator, whether each pixel is transparent or opaque. The system permits the aforementioned data of the detected object to be written in the line buffer only at a storage area which corresponds to the display position of the detected object and also to the opaque section of the same.

In accordance with the present invention, thus, the judgement of each pixel of the detected object whether it is transparent or opaque is accomplished by the use of binary pixel data from the shape generator. Since the binary pixel data are represented by one-bit data, "0" or "1", this binary pixel data themselves can be used as writing signal to the line buffer. Accordingly, the aforementioned judgement can be achieved more rapidly by a simplified circuit, as compared with the conventional system in which 8-bit color codes are parallel processed to perform the similar judgement.

(b) Function inherent in the First Concept of the Present Invention

The system constructed according to the first concept of the present invention can together overcome the aforementioned second and third concept of the present invention. When an object which is to be calculated in synchronism with the horizontal scan and to be displayed on a horizontal scan line is detected, the data of each detected object are read out from the object data memory and then stored in the object memory sequentially at the corresponding storage area thereof. At this time, the write address of the detected object to the object memory is stored in the line buffer sequentially at its storage areas corresponding to the pixels on the horizontal scan line.

Based on the address data stored in the line buffer for one horizontal scan line, the data of the detected object are read out from the object memory for each pixel and then applied to the character generator. In such a manner, the first concept of the present invention is adapted to store data indirectly representative of the data of the detected object, that is, the write addresses of the detected object to the object memory, rather than the direct writing of the object data to the line buffer.

Although the system of the present invention requires the object memory in addition to the necessary components of the prior art system, it can greatly reduce the storage capacity of the line buffer, so that the storage capacity of the entire memory will be reduced sharply to decrease the manufacturing cost of the entire system.

In accordance with the present invention, therefore, the capacity of the entire memory can be steeply reduced where the number of colors in an object to be displayed increases together with its attribute data to increase data required to display the object.

In accordance with the present invention, furthermore, the line buffer can be custom-chipped to reduce the manufacturing cost on the entire system, if required, since it is not required to increase or decrease the storage capacity of the line buffer even if the amount of information on an object to be displayed increases or decreases.

BRIEF DESCRIPTION OF THE DRAWINGS

FIGS. 5A, 5B and 5C form is a view exemplifying a memory in the line buffer shown in FIG. 1.

FIG. 8 is a block diagram showing the relationship between FIGS. 8A and 8B;

FIGS. 8A and 8B form a block diagram showing the concrete arrangement of the object detecting circuit shown in FIG. 1.

FIG. 9 is a block diagram showing the relationship between FIGS. 9A, 9B and 9C;

FIGS. 9A, 9B and 9C form a block diagram showing the concrete arrangement of the various components in the circuit of FIG. 1.

FIG. 14 is a block diagram showing the relationship between FIGS. 14A, 14B and 14C;

FIGS. 14A, 14B, and 14C form a block diagram showing the concrete arrangement of the object detecting circuit shown in FIG. 13.

FIGS. 16A and 16B are views exemplifying the image of objects registered in the character generator.

DETAILED DESCRIPTION OF THE PREFERRED EMBODIMENTS

Figure 1:
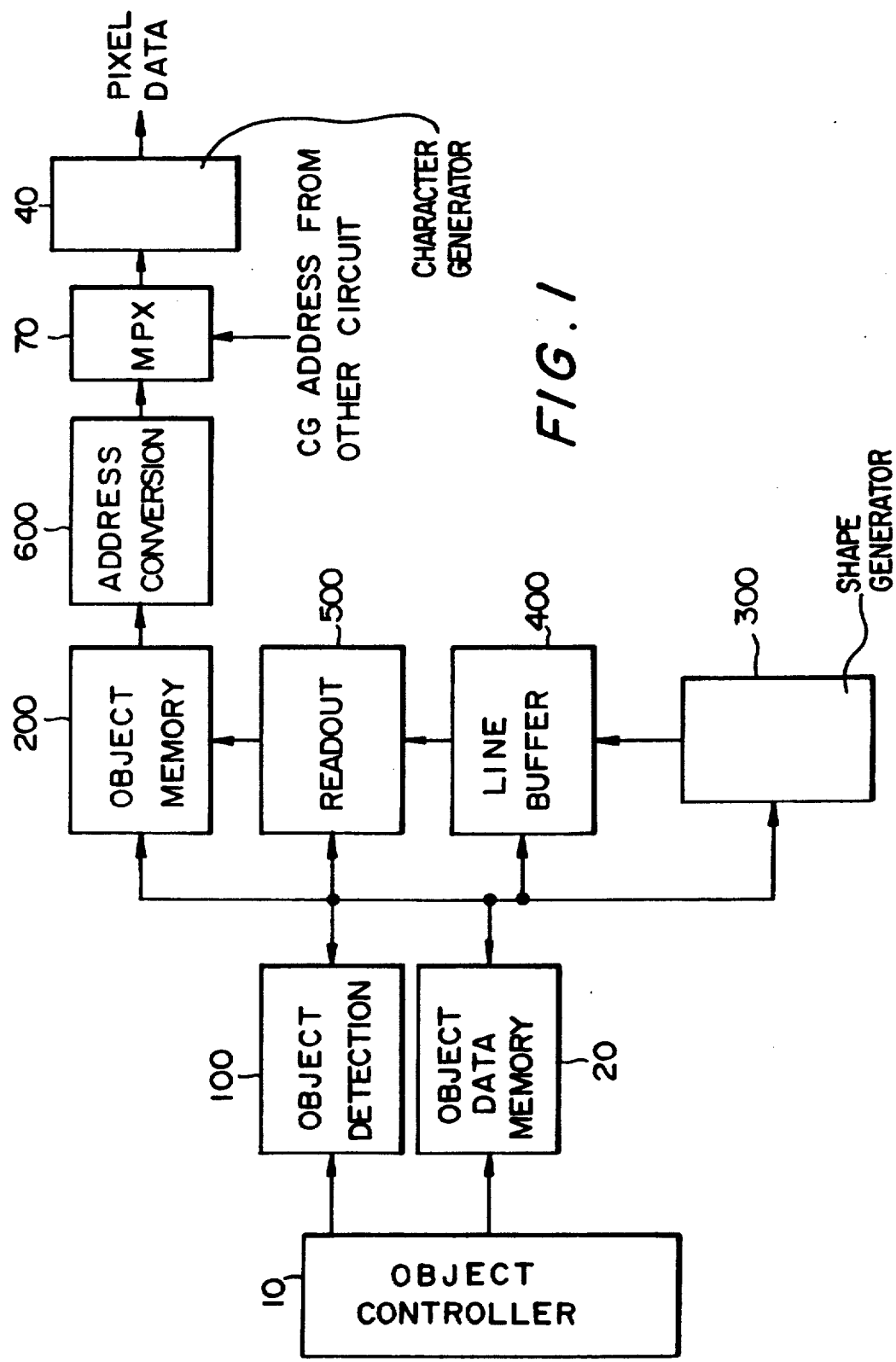
FIG. 1 is a block diagram of a preferred embodiment of an object display system constructed according to the present invention.

The present invention will now be described in connection with some preferred embodiments thereof which are illustrated in the drawings. Parts similar to those in the conventional object display system are designated by similar reference numerals and will not be further described.

FIRST EMBODIMENT

FIG. 1 shows a preferred embodiment of the present invention which is applied to a video game. In this embodiment, the object display system comprises an object controller 10 and an object data memory 20. At each time when the data of an object to be displayed on CRT for one scene are processed by the object controller 10, the processed data will be written in the object data memory 20.

(a) Object Data Memory

Figure 2:
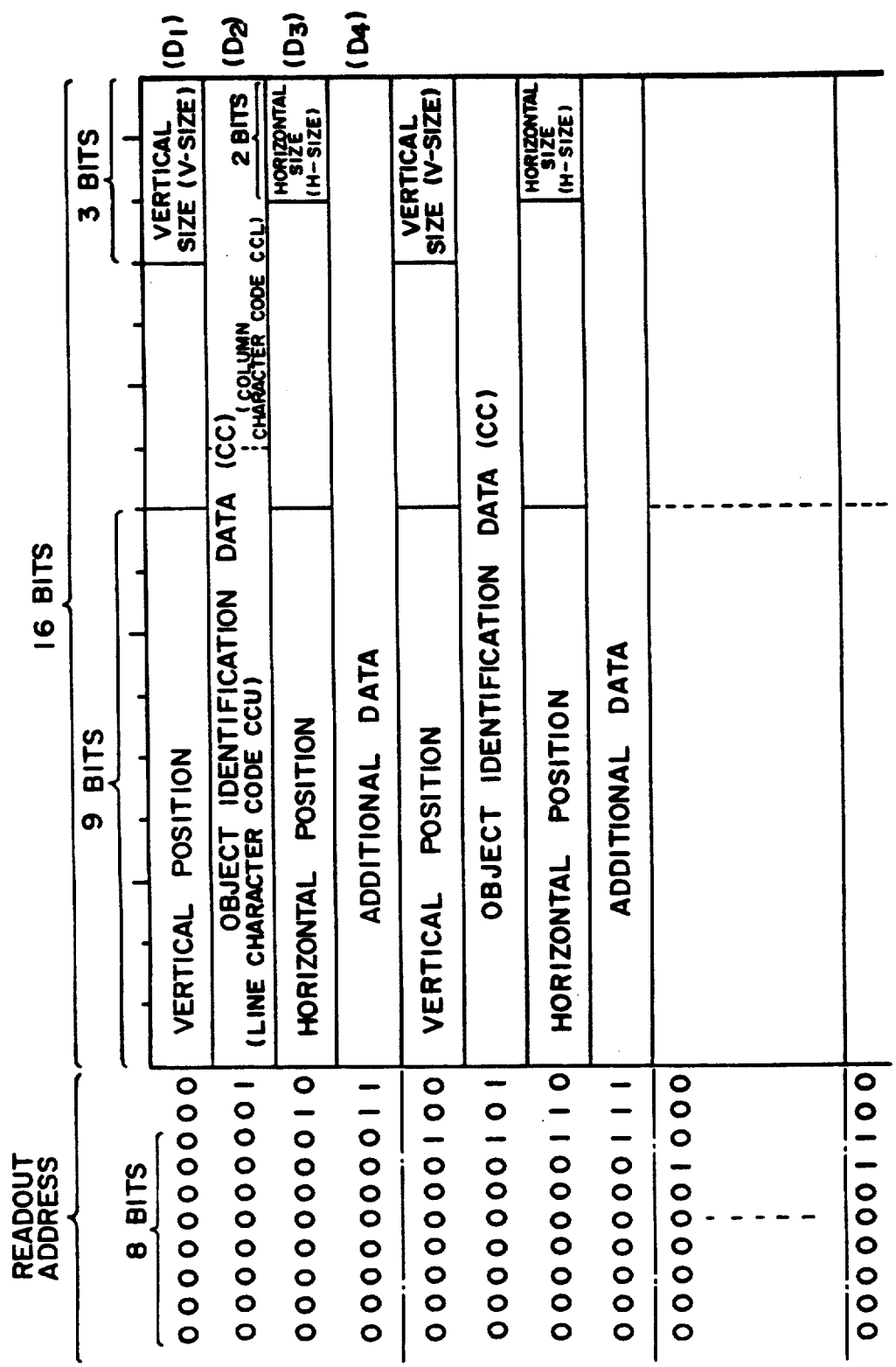
FIG. 2 is a view exemplifying an object memory usable in the object display system shown in FIG. 1.

FIG. 2 shows one of object data memories 20 which can be used in the first embodiment of the present invention. In the illustrated object data memory 20, a 16-bit storage area is assigned to each address. The storage areas corresponding to four addresses are combined into one set in which the data of one object to be displayed are written.

Data of the first object are written in the object data memory at storage areas having readout addresses wherein high-order eight bits are "00000000", that is, 10-bit addresses ranged between "0000000000" and "0000000011". Data of the second object are then written in the object data memory at storage areas having readout addresses wherein high-order eight bits are "00000001", that is, addresses ranged between "0000000100" and "0000000111". Such a procedure will be repeated to write the data of each of objects to be displayed sequentially in the object data memory.

The writing of data into the object data memory will be described in connection with the storage areas ranged between "0000000000" and "0000000011" in which the data of the first object are written.

First of all, vertical display position data of nine bits representative of the vertical display position of the first object and vertical size data of three bits (V-SIZE) are stored in the object data memory at a storage area specified by two low-order bits "00" in the 10-bit address.

At a storage area specified by two low-order bits "01" in the 10-bit address, object identification data CC of 16 bits (ten high-order bits are representative of a line character code CCU and six low-order bits are representative of a column character code) are then stored in the object data memory.

Horizontal display position data of nine bits representative of the horizontal display position of the object and horizontal size data (H-SIZE) of two bits are further stored in the object data memory at a storage area specified by two low-order bits "10" in the 10-bit address.

Finally, additional data of 16 bits (e.g. priority order data, color pallet data and others) are stored in the object data memory at a storage area specified by two low-order bits "11" in the 10-bit address.

Herein, the vertical and horizontal size data (V-SIZE and H-SIZE) are used to display a larger composite object by combining a plurality of character blocks together.

(b) Character Generator

The dimensions of each of the character blocks are preset in a character generator 40. In the first embodiment, one character block is represented as block data corresponding to the total number of pixels equal to 64 which are defined by eight longitudinal pixels times eight transverse pixels.

In such a situation, however, the maximum dimensions of an object capable of being displayed on the CRT are one defined by eight longitudinal pixels times eight transverse pixels. Any object having its dimensions larger than the above dimensions cannot be displayed on the CRT.

In order to play the game with more pleasure, however, it is required to enable the dimensions of objects to be displayed on the CRT to increase depending on game states.

For this purpose, the character generator 40 in the first embodiment registers objects having various dimensions. Namely, each of the objects registered in the character generator 40 is formed by one or more character blocks combined into a matrix configuration which can represent a composite object sized into any dimensions.

Figure 3:
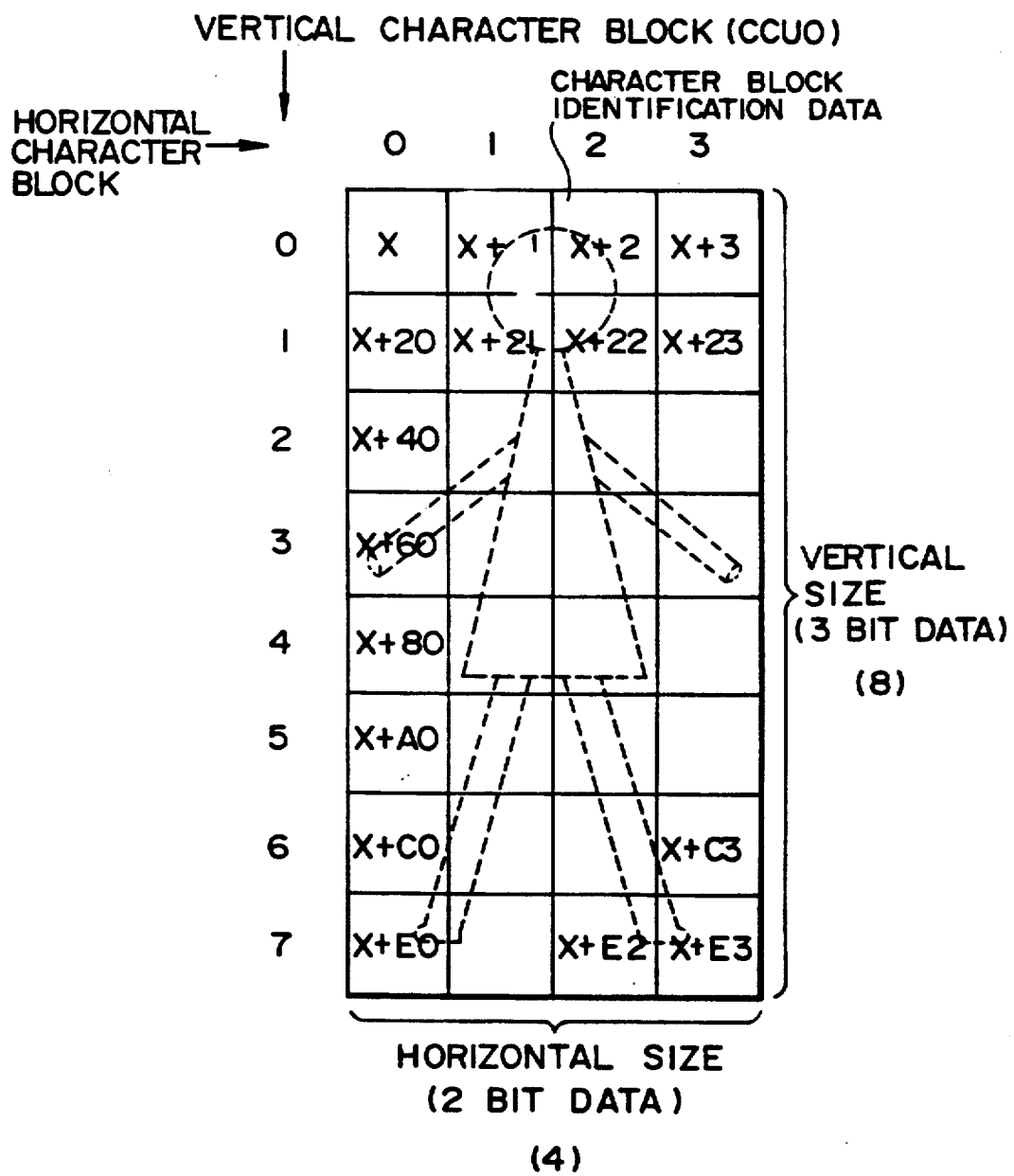
FIG. 3 illustrates the principle of the present invention in which a plurality of objects are used to display a composite object having its larger dimensions.

FIG. 3 shows an object having maximum size which is preregistered in the character generator 40. This object is preselected as a larger composite image (e.g. of human) defined by the total number of blocks equal to 32 which comprises eight character blocks specified by vertical character blocks CCUO designated "0" through "7" and four character blocks specified by horizontal character blocks designated "0" through "3".

The object having such dimensions as shown in FIG. 3 has a first reference character block specified by object identification data CC (as shown by "X" in this figure) and is specified in size by vertical and horizontal size data.

If the size of the object is identical with that of a character block, both the vertical and horizontal size data are provided to be "0".

(c) Detection of Object to be Displayed

There is further provided a circuit 100 for detecting an object to be displayed. The object detecting circuit 100 is responsive to the horizontal scan on the CRT to detect an object to be calculated and displayed on the horizontal scan lines, based on the object data written in the object data memory 20. Data relating to each of the detected objects are read out from the object data memory 20. The readout data are then applied sequentially to an object memory 200, shape generator 300 and line buffer 400. The data of each of the readout objects are stored in the object memory 200 at the respective storage areas.

(d) Object Memory

Figure 4:
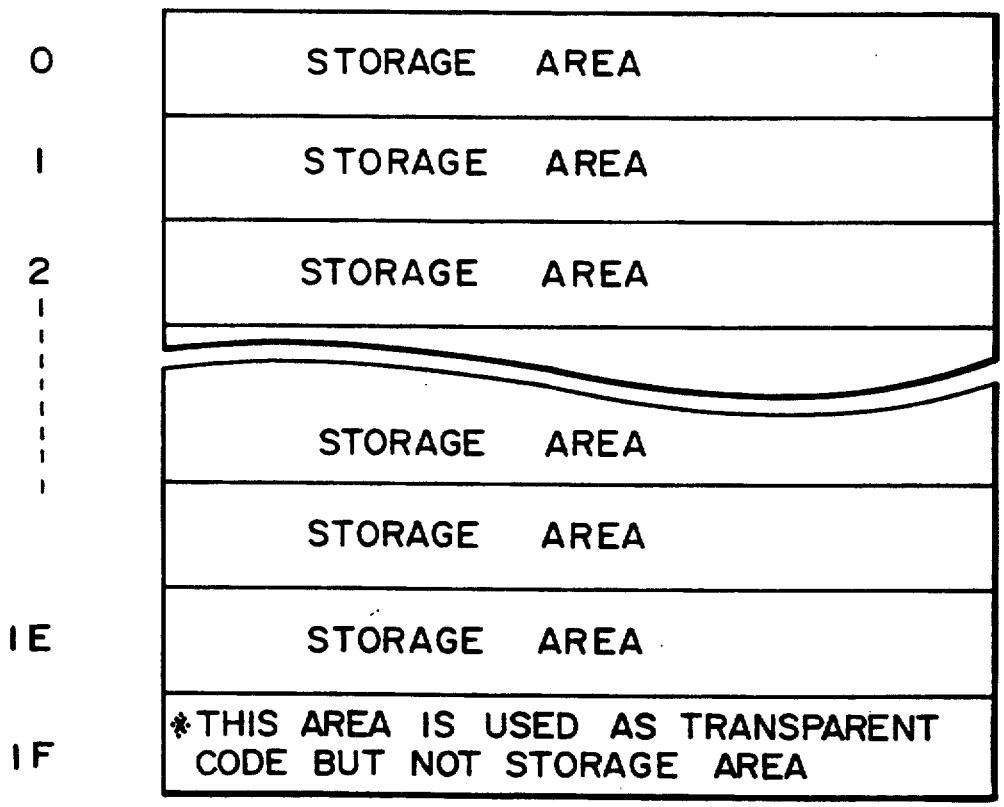
FIG. 4 is a view exemplifying a memory map usable in the object memory shown in FIG. 1.

FIG. 4 exemplifies an object memory 200 which can be used in the first embodiment of the present invention. The object memory 200 includes storage areas specified by the total number of addresses equal to 31, designated "0"–"1E" (as represented by sexadecimal notation). As described, the data of each of the objects read out from the object data memory 20 are written in the object memory 200 sequentially at its storage areas, starting from the lowermost address.

Where addresses equal in total number to 31 are specified as described above, only 5-bit address data is required. In such a case, addresses equal in total number to 32 can be specified with the thirty-second address corresponding to "1F" (represented by sexadecimal notation) which is used as a transparent code.

(e) Line Buffer

The line buffer 400 is provided to have storage areas corresponding in number to the number of pixels for one horizontal scan. In the first embodiment, one horizontal scan line on the CRT is formed by pixels equal to 288 dots. Thus, the illustrated line buffer 40 includes storage areas respectively specified by total number of addresses equal to 288, that is, addresses "0" through "287".

The present invention is characterized by write addresses of each of the detected objects in the object memory 200 being written in the line buffer 400, but the data of each of the detected objects are not directly written in the line buffer 400.

In such a manner, the storage capacity of the line buffer 400 can be reduced steeply. In other words, the object display system of the present invention can be inexpensively manufactured by reducing the entire storage capacity of the memory since the object memory 200 should be added into the system, but the storage capacity of the line buffer 400 can be reduced sharply.

Where the object memory 200 is addressed by 0–31 as in the illustrated embodiment, each of the storage areas in the line buffer 400 is only required to write 5-bit data therein (as specified by addresses equal to $2^5=32$. It is therefore understood that the necessary storage capacity in the first embodiment can be greatly reduced, compared with the conventional system requiring a minimum of 16 bits to write the object data in the line buffer at each storage area.

In accordance with the present invention, particularly, each of the storage areas in the object memory 200 is only required to be expanded without need of any modification to the line buffer 400 even if the data of each object is increased. Therefore, the object display system of the present invention can accommodate itself to increase of the object data, for example, the increased number of colors or attributes rapidly and inexpensively.

(f) Judgement of Transparent or Opaque

When a plurality of overlapped objects are displayed, the data of one of the objects having its higher priority order must be written at the overlapped portions of the image.

It is now assumed that an object written in the object memory 200 at an address "0" (wherein eight high-order bits in the readout address shown in FIG. 2 is "00000000") is displayed at a region shown by "S" in FIG. 5A and that another object written in the object memory 200 at an address (wherein eight high-order bits in the readout address shown in FIG. 2 is "00000001") is displayed at a region shown by "T" in FIG. 5A. When it is wanted herein to display the object written in the object memory 200 at the address "1" backwardly in a scene on the CRT and to display the object written in the object memory 200 at the address "0" forwardly in the same scene, the object of the address "0" will be preferentially displayed at a region on which the overlapped objects are displayed. However, if part(s) of the object relating to the address "0" is (are) transparent, the backwardly displayed object can be viewed by an operator through the transparent part(s).

For example, if the object of the address "0" in the region S is transparent at its pixel sections "n−1" and "n", the address "0" of the object memory 200 should be written in the region S of the line buffer 400 only at storage areas corresponding to opaque sections in the object, as shown in FIG. 5B.

If it is assumed that the object to be displayed at the region T is opaque over eight pixels, the address "1" of the object memory 200 should be written in the region T of the line buffer 400, as shown in FIG. 5C.

Furthermore, the address "0" of the object having its higher priority order must be written in the line buffer 400 at its storage areas corresponding to addresses "n+1" and "n+2".

In such a manner, the address data of the object memory 200 will be written in the line buffer 400 at the regions shown by S and T in FIG. 5A. Thus, the system of the first embodiment is required to judge whether or not each of the pixels in the object is transparent, on writing the address of each of the objects in the line buffer 400. The present invention is characterized by that such a judgment is achieved by a shape generator 300.

The shape generator 300 is pre-registered with the image of an object having the same size as that of the character generator 40 as binary pixel block data relating to transparency/opaqueness.

The shape generator 300 is adapted to specify block data representative of the same object as that of the character generator 40 by the same object identification data and also to output binary image data for one horizontal scan (eight pixels) as transparency judging data, based on the vertical in-block scan position data.

Figure 6:
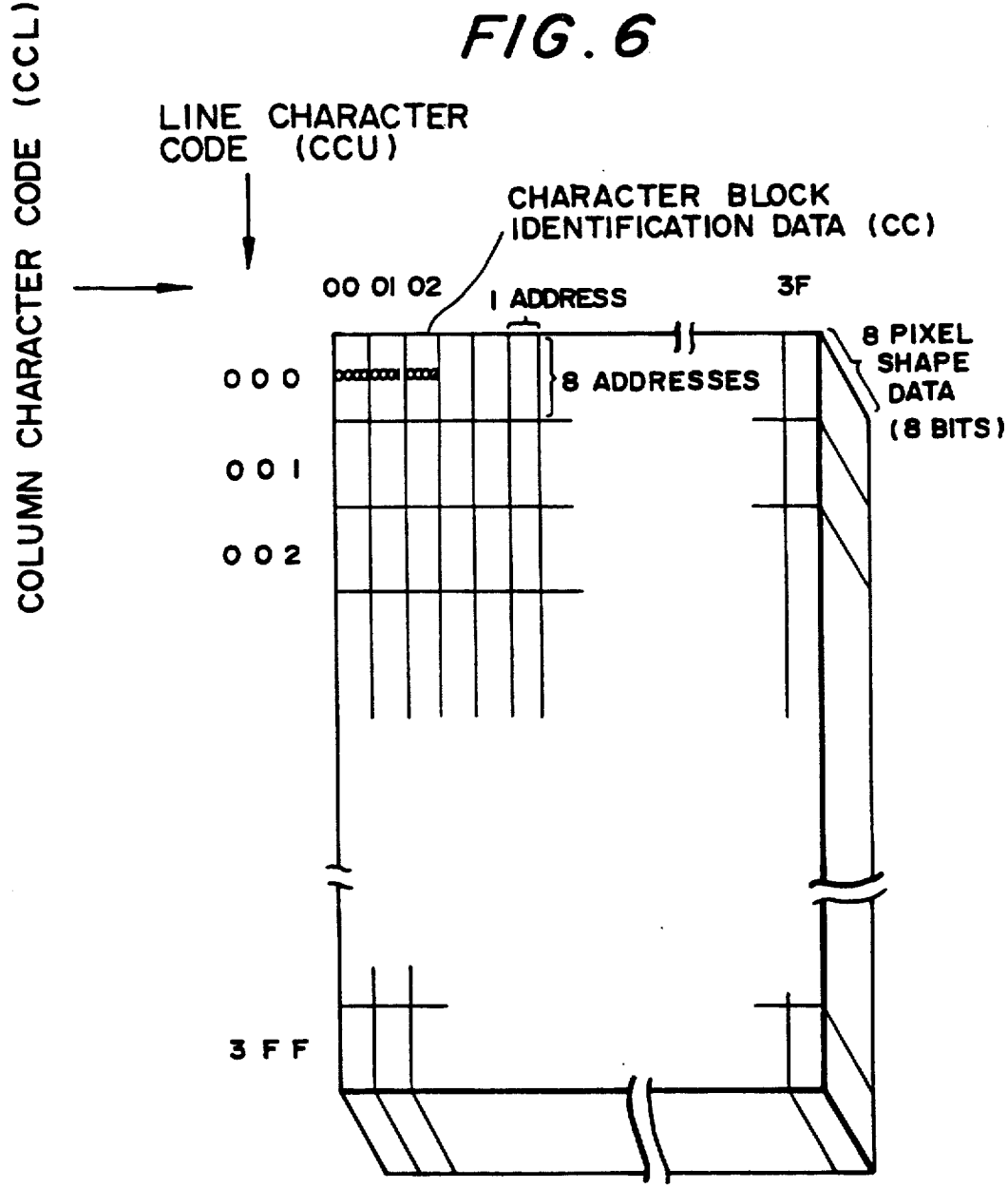
FIG. 6 is a view exemplifying a memory in the shape generator shown in FIG. 1.

FIG. 6 shows a shape generator 300 usable in the first embodiment. The shape generator 300 is pre-registered with binary pixel block data which are specified by the object identification data CC, that is, the line character codes CCU and the column character codes CCL.

Each of the block data is matrix data composed of the total number of pixels equal to 64 which are defined by eight horizontal pixels times eight vertical pixels. One-bit data is assigned to each of the pixels to represent whether or not that pixel is transparent. Thus, one-block data will be represented as 64-bit data.

Figure 7:
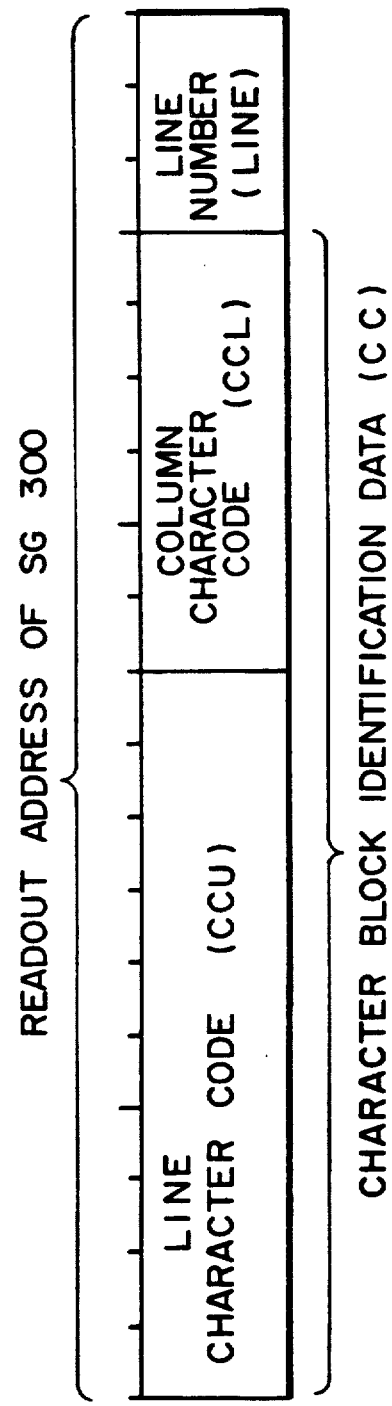
FIG. 7 illustrates the arrangement of a readout address in the memory shown in FIG. 6.

FIG. 7 shows an address for reading the block data of the corresponding object from the shape generator 300. From the shape generator 300, there can be read the block data of the corresponding object for one horizontal scan by specifying the line character code CCU, column character code CCL and line number therefor.

In other words, the first embodiment is adapted to specify the block data by the use of line character code CCU and column character code CCL and also to specify the horizontal scan line data within this block data by the use of the line number corresponding to the horizontal scan line data.

As horizontal scan line data to be read are specified by this address, binary pixel data for one horizontal scan in the corresponding block data will be read from the shape generator 300.

The binary pixel data so read are representative of the configuration of the corresponding object as transparent or opaque data for each pixel. By comparing the transparent or opaque data of the read object with its display position, the write address of the detected object to the object memory 200 can be written in the line buffer 400 only at its storage areas which correspond to the display position of the detected object and yet to the opaque sections in the detected object.

It is also required that the shape generator 300 is registered with objects having various sizes as in the character generator 40.

For such a purpose, various sizes of objects each formed by combining one or more kinds of character block data into a matrix configuration are registered and set in the shape generator 300.

FIG. 3 exemplifies one of maximum-sized objects registered in the shape generator 300. This object is formed by the total number of block data equal to 32 which are defined by eight character blocks specified by vertical character blocks CCU0, designated "0" through "7", and four character blocks specified by horizontal character blocks, designated "0" through "3", to display a large-sized composite image (e.g. of human) in the whole, as described hereinbefore.

The large-sized object shown in FIG. 3 will thus have its first character block as a reference block specified by the object identification data CC and its dimensions specified by the vertical and horizontal sizes.

Although the shape generator 300 is used to judge whether or not each of the pixels in an object is transparent in the first embodiment of the present invention, the shape generator 300 can be replaced by the character generator 40 for such a judgement as in the prior art.

However, 8-bit color code data is included in the output of the character generator 40 for each pixel. Thus, the amount of data used to perform the above judgement is increased eight or more times that of the shape generator 300. This means that the process speed is decreased.

On the contrary, the shape generator 300 can reduce the amount of data to be handled thereby to cause the entire system to be simplified and manufactured more inexpensively and carry out the above judgement more rapidly.

(g) Readout of Data

After the address data of each of the objects to be displayed on the corresponding horizontal scan line have been written in the object memory 200 as described in the items (d) and (e), a readout circuit 500 then reads the object data from the object memory 200 for each one dot, based on the address data stored in the line buffer 400 for one horizontal scan line. The object data are then applied to a readout address converting circuit 600.

The readout address converting circuit 600 is adapted to convert the inputted object data into a data reading address for the character generator 40, which in turn is outputted toward a multiplexer 70.

The multiplexer 70 compares the address data from the address converting circuit 600 with address data from the other circuit. Among these address data, an address data having its higher priority order is outputted from the multiplexer 70 to the character generator 40 which in turn outputs the pixel data of the corresponding object, based on the readout address so inputted.

In such a manner, the system of the first embodiment is adapted to repeat the writing and reading of data for the object memory 200 and line buffer 400 in synchronism with the horizontal scan. Therefore, an object corresponding to one scene calculated by the object controller 10 will be displayed exactly on the CRT.

In particular, the first embodiment has the newly provided shape generator 300 which is used to judge whether or not each pixel is transparent, without access to the character generator 40. Thus, the entire system can first mix the readout address from the address converting circuit 600 with the readout address from the other circuit and thereafter output the pixel data only by one access to the character generator 40. Therefore, the entire system can be manufactured more inexpensively by sharing the character generator 40, which has its increased capacity and is increased in cost per single part, with the other display circuits.

If the shape generator 300 is formed by a RAM in the first embodiment, it can set and register the necessary binary image data of an object as block data by comparing the objects written in the character generator 40 with one another. In a video game, for example, it is possible that the storage capacity of the shape generator 300 has been set for the capacity of the block data of an object used in each stage even through a different type of object is used at each time when the stage is changed from one to another. At each of those times, the shape generator 300 can compare the data of each of the objects stored in the character generator 40 with one another to write the block information of binary pixel data for a new object to be used in the next stage during the stage switching interval providing a blank time.

By so doing, the storage capacity of the shape generator 300 can be minimized to decrease the manufacturing cost of the entire system even if the video game comprises ten stages in each of which a different object is used.

If the system of the first embodiment is applied to a home video game, therefore, character data written in a ROM incorporated into a cartridge are converted into transparent and opaque data which in turn are taken in a RAM provided in the main body of the game machine at each stage. The RAM can be utilized as a shape generator.

In such an arrangement, the number of input/output pins connecting the cartridge with the game machine body can be reduced to simplify the constructions of the game machine body and cartridge, compared with a case where a shape generator is provided in the cartridge which is detachably mounted in the game machine body.

CONCRETE EXAMPLES

The first embodiment of the present invention will now be described more concretely.

(a) Object Detecting Circuit

Figure 8B:
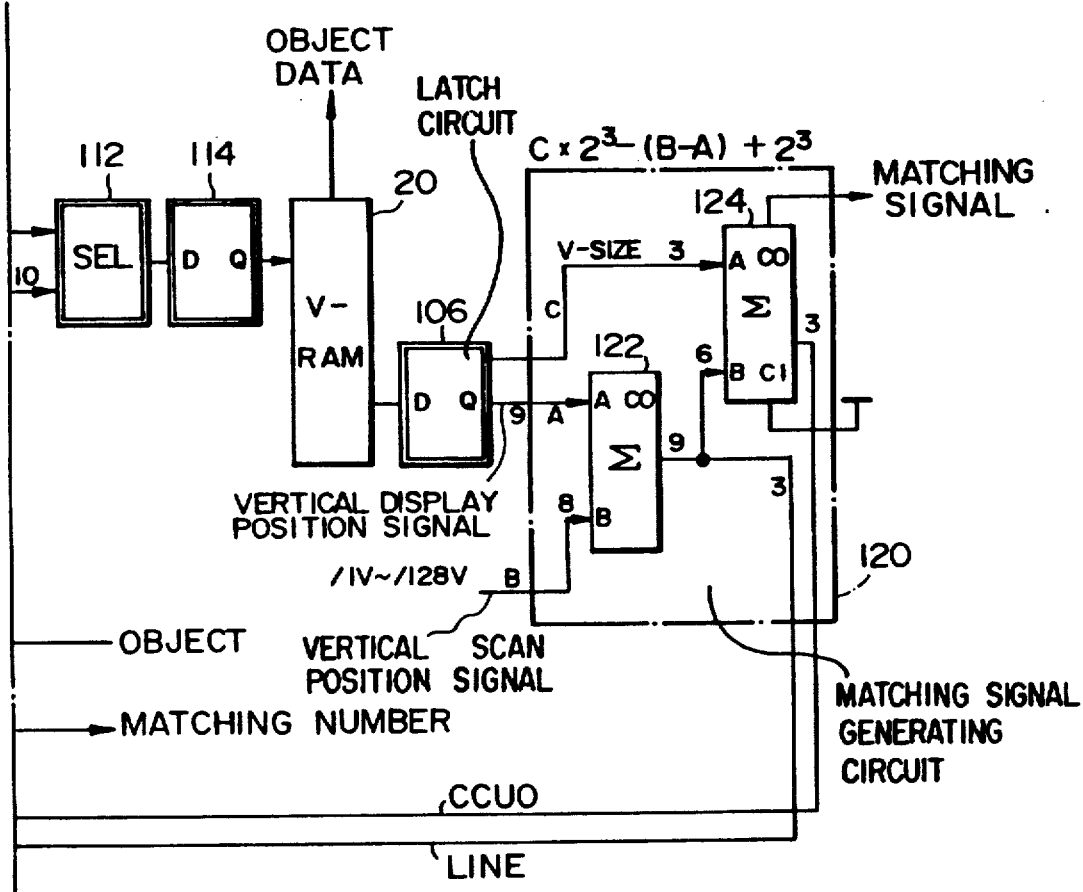

FIG. 8 shows an object detecting circuit 100 usable in the present invention, which comprises an object counter 110, a matching signal generating circuit 120 and a matching circuit 130.

(a-1) Detection of Object for Each Horizontal Scan

The object counter 110 is adapted to output readout addresses of all objects to be displayed toward the object data memory 20 for each horizontal scan.

In the illustrated embodiment, the object data memory 20 includes 10-bit addresses set therein as shown in FIG. 2. Thus, the object counter 110 sequentially outputs eight high-order bits in each of the 10-bit addresses as readout addresses. In FIG. 2, readout addresses for all the objects to be displayed are sequentially outputted from the object counter 110 in the illustrated order of "00000000", "00000001", "00000010" and so on. At this time, these readout addresses also are supplied to the matching circuit 130 through a three-stage shifter 108.

As the readout address of each of the objects to be displayed is sequentially outputted from the object counter 110, "00" is added to two low-order bits in this readout address, which in turn is inputted into the object data memory 20 through a selector 112 and a flip flop 114. Thus, the vertical display position A and vertical size C of the corresponding object on the CRT are read out from the object data memory 20. These data are then applied to the matching signal generating circuit 120 through a latch circuit 106.

The matching signal generating circuit 120 compares the vertical display position signal A of each of the read objects with the vertical scan position signal B on the CRT. If that object can be displayed on the corresponding horizontal scan line, the circuit 120 generates a matching signal at its output and at the same time calculates and outputs the vertical in-block scan position signal of that object.

In the illustrated embodiment, the matching signal generating circuit 120 comprises a set of adders 122 and 124. Based on the signals A, B and C inputted thereinto, the following judgement will be made therein:

$$0 < C \times 2^3 - (B-A) + 2^3 \leq C \times 2^3 + 2^3.$$

As this formula is fulfilled, it is judged that the object can be displayed on the corresponding horizontal scan line. The adder 124 outputs a matching signal.

At the same time, the adder 122 calculates and outputs a line number LINE representative of the vertical in-block scan position of the object. Further, the adder 124 calculates and outputs a vertical character block CCUO representative of the number of block in the vertical direction on the object, as shown in FIG. 3.

The object detecting circuit 100 performs such a calculation with respect to all the objects stored in the object data memory 20 to judge whether or not each of the objects can be displayed on the corresponding horizontal scan line.

The matching circuit 130 includes two matching circuits 130-1 and 130-2 such that they will alternately perform the writing and reading in synchronism with the horizontal scan on the CRT.

Each of the matching circuits 130-1 and 130-2 consists of a matching counter 132 and a matching RAM 134.

During detection of an object to be displayed on one horizontal scan line, the matching counter 132 counts the value of a matching signal at each time when it is outputted with the value being then outputted as a matching number. After such a detection, the matching counter 132 is switched from its up-counting to its down counting operation such that the counted value will be decremented by one count in synchronism with a periodic signal having its frequency equal to ⅜ times the dot clock (0.75 MHz).

The matching RAM 134 includes storage areas corresponding in number to the number of objects to be displayed on one line.

During detection of an object to be displayed on one horizontal line, the matching number from the matching counter 132 is used as the write address of that object such that a set of data including a detected object readout address from the object counter 110, a vertical scan position signal LINE (line number) from the matching signal generating circuit 120 and a vertical character block CCUO will be stored in the matching RAM 134 at the corresponding storage area thereof.

(a-2) Readout of Object for Each Horizontal Scan

After the object to be displayed on one horizontal scan line has been detected, the matching number decremented in the matching counter 132 is used as a readout address by the use of which the data of that object are read out from the matching RAM 132.

Figure 9B:
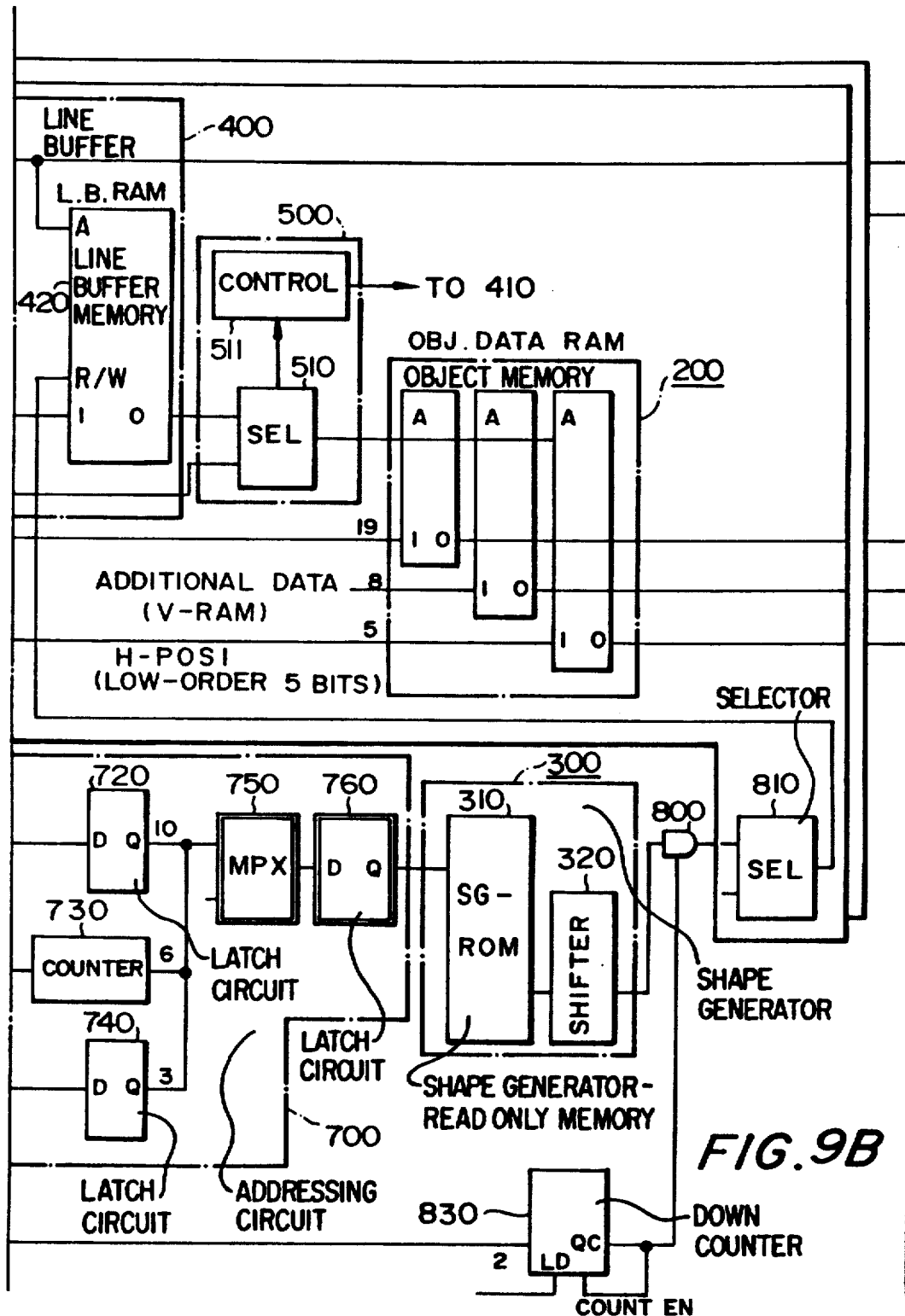
Figure 9C:
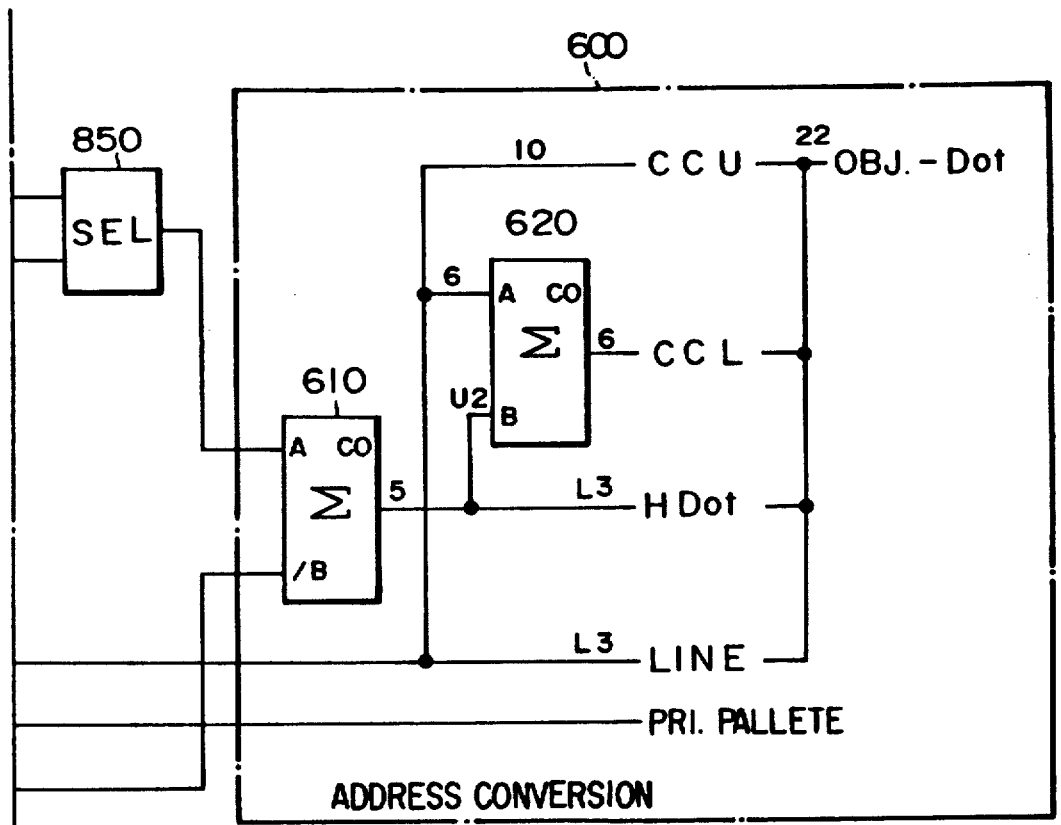

The read data of each of the objects are applied to an addressing circuit 700 shown in FIG. 9 while the readout address of the object also is supplied to a selector 112.

Eight-bit signal of the matching RAM 134 which is outputted to the selector 112 is combined with the output of a two-bit counter 136, the resulting 10-bit object readout address being then supplied to the object data memory 20.

The output of the counter 136 is counted from "00" to "11" before the eight-bit readout address from the matching RAM 134 is changed.

In other words, the counter 136 is adapted to make its counting operation in synchronism with the synchronous signal of 3 MHz. Thus, the counting operation can be made at a speed four times the down-counting speed in the matching counter 132.

If it is assumed that a readout address of "00000000" (eight high-order bits in the address shown in FIG. 2) is outputted from the matching RAM 134, data corresponding to four addresses including all the 10-bit addresses "0000000000" to "0000000011" shown in FIG. 2, that is, a set of object data will be read out from the object data memory 20. The read set of object data are then supplied to various circuits shown in FIG. 9, depending on the contents thereof.

Thus, the object detecting circuit 100 can function to detect each of objects to be displayed on one horizontal scan line, to output the readout address signal, vertical character block signal CCUO and vertical in-block scan position signal LINE of that object and to read out all the data of the detected object from the object data memory 20.

FIG. 9 shows the concrete arrangements of the shape generator 300, line buffer 400, address converting circuit 600 and addressing circuit 700.

(b) Address Converting Circuit

The vertical character block CCUO and vertical in-block scan position signal (line number) LINE outputted from the matching RAM 134 for each object and the object identification data CC read out from the object data memory 20 for that object are inputted into the addressing circuit 700.

The system of the first embodiment is adapted not only to display an object having its size corresponding to that of one character block, but also to display a larger object formed by a plurality of character blocks which are arranged into a matrix as shown in FIG. 3. However, the object identification data CC can only specify a character block functioning as a reference in the object. If there is not any addressing means, a desired character block to be read out cannot be specified from the great number of character blocks which have been registered in the shape and character generators 300 and 40.

To this end, said addressing circuit 700 is provided in the system of the first embodiment. The addressing circuit 700 includes an adder 710 in which among the inputted data, a line character code CCU specifying the reference character block in the object and vertical three-bit character block data CCUO representing the number of a character block to be read out from said reference character block in the vertical direction are added and outputted together. Thus, the adder 710 will calculate and output a line character code specifying the vertical character block of an object to be displayed on the horizontal scan line (see FIG. 3) in the form of a new line character code CCU which defines part of the readout address shown in FIGS. 7 and 12.

Figure 11:
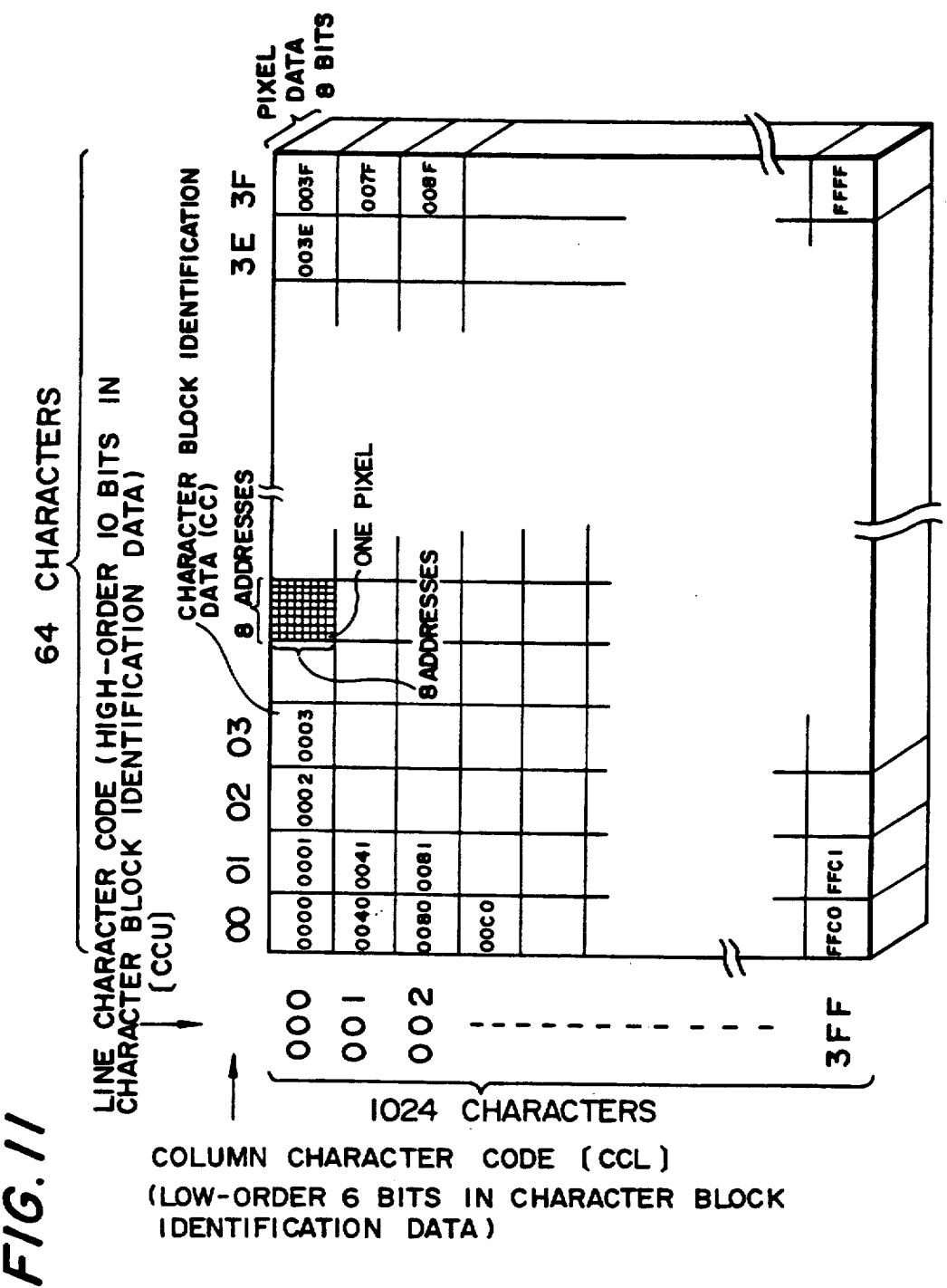
FIG. 11 illustrates the general memory of the character generator.

The 10-bit data outputted from the adder 710, the six low-order bits in the object identification data inputted into the addressing circuit 700 and the vertical in-block scan position data of three bits are then used as the line character code, column character code and line number in the shape and character generators 300 and 40 shown in FIGS. 7 and 11.

Such address data are applied to the object memory 200, latch circuits 720, 740 and a counter 730, respectively.

(c) Object Memory

At this time, the object memory 200 receives a horizontal position signal and other additional data from the object data memory 20 in addition to the aforementioned data.

The data of each object inputted as described are sequentially stored in the object memory 200 at its storage areas each of which is specified by the decremented matching number from the matching counter 132.

In other words, the object memory 200 includes such storage areas arranged as shown in FIG. 4, at which the data of the objects are sequentially written and stored by using the matching numbers from the matching counter 132 as write addresses.

(d) Shape Generator

When an address is inputted from the latch circuits 720, 740 and counter 730, the line character code CCU is first outputted directly to a multiplexer 750 through the latch circuit 720. The column character code CCL is utilized as an initial value in the counter 730 (at speed four times that of the matching counter 132) which counts up in synchronism with the synchronous signal of 3 MHz. The resulting counted data are then applied to the multiplexer 750. The multiplexer 750 is electrically connected to shape generator 300 by latch circuit 760. For a time when data relating to one object are read out by the matching counter 132 from the matching RAM 134, the shape generator 300 will output shape data corresponding to one line in a maximum of four successive character blocks in the horizontal direction. This means that an object can be displayed spanning a maximum of four character blocks in the horizontal direction, as shown in FIG. 3. Further, the line number LINE is outputted directly to the multiplexer 750 through the latch 740.

The shape generator 300 further comprises a shape generator ROM 310 in which the data shown in FIG. 6 are preset, and an eight-bit shifter 320 for converting eight-bit parallel data from the ROM 310 into series data.

Eight-bit data of the corresponding object for one horizontal scan are then read out from the shape generator ROM 310 based on the inputted address. The eight-bit data so read out are then converted by the eight-bit shifter 320 into series data in which they are divided into one representative of transparency and another representative of opaqueness. These series data are then outputted, as write addresses, to the line buffer 400 through a gate 800 and selector 810.

The gate 800 is adapted to be opened depending on the horizontal size of an object read out from the object data memory 20. In the illustrated embodiment, there is provided a three-bit down counter 830 adapted to make the down-count control to open or close the gate 800, based on the horizontal size of the object latched in the latch circuit 820.

In other words, the horizontal size of two bits read out from the object data memory 20 is supplied to the three-bit down counter 830 through the latch circuit 820 as two low-order bits in the initial value of the down counter 830. At this time, one high-order bit in the initial value is set into "1".

The down counter 830 makes its counting-down operation at the same speed as that of the counter 730. If one high-order bit in the count data is "1", the down counter 830 permits data to pass through the gate 800. Since the one high-order bit in the count data is set into "1" by the down counter 830 for a time when the horizontal size data are counted therein, data can be permitted to be written in the line buffer 400 only when the data are within the horizontal size and the shape data are "1".

(e) Line Buffer

The line buffer 400 comprises a line buffer counter 410, a line buffer memory 420 and a mask 430.

The line buffer memory 420 includes storage areas corresponding in number to the number of pixels for one horizontal scan, as shown in FIG. 5. The line buffer memory 420 uses binary pixel data from the shape generator 300 as read/write signal. In other words, as data representative of opaque object (for one pixel) are outputted from the shape generator 300, the line buffer memory 420 is adapted to write the matching number decremented by and outputted from the matching counter at an address specified by the line buffer counter 410.

The matching number outputted from the matching counter 132 is once latched by the latch circuit 840 and then inputted into the line buffer memory 420 through the mask circuit 430 as write data. The mask circuit 430 is adapted to clear all the contents of the memory 420 by the use of a so-called "read-modifying-write" technique, that is, a technique in which clear data (transparent data "1F" at the illustrated embodiment) are written in the memory 420 at the same address immediately after the reading-out has been made.

The line buffer counter 410 is adapted to output a write address signal having its width corresponding to 32 pixels in the horizontal scan direction (e.g. corresponding to four character blocks) to the line buffer memory 420 by the use of a write start address which is an address specified by the horizontal display position signal of a detected object at each time when the data thereof are outputted from the object data memory 20.

It is now assumed that a matching number inputted is "0" and that among transparency/opaqueness data of the 32 pixels outputted from the shape generator 300, the data corresponding to only the first four pixels represent that they are opaque. If data representative of 100-th pixel are inputted as a horizontal position signal of that object, the line buffer counter 410 increments the counts to start from the initial address "100" and terminate at the address "131".

Figure 10:
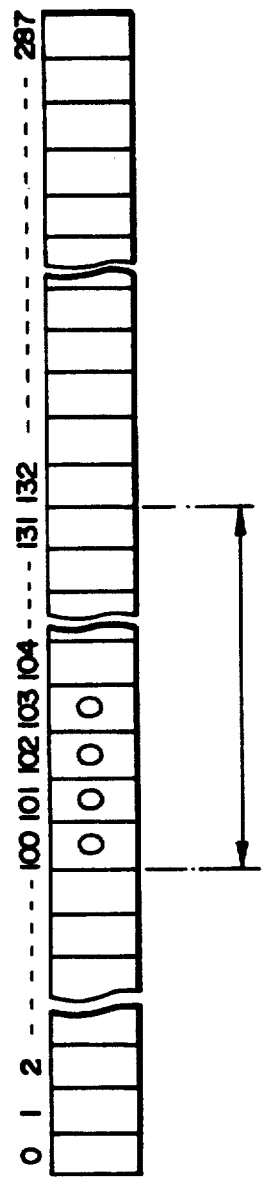
FIG. 10 illustrates the line buffer memory shown in FIG. 9.

As shown in FIG. 10, therefore, the matching number "0" will be stored in the line buffer memory 420 only at storage areas ranged between "100" and "103" in which the opaque sections of the object are to be displayed.

In such a manner, the matching number of each of the objects to be displayed on the corresponding horizontal scan line can be written in the line buffer memory 420 for each horizontal scan.

Such a writing in the line buffer memory 420 may be performed even if the corresponding storage area has been occupied by the other data. In the illustrated embodiment, the later writing operation is preferentially made. This means that the writing is performed to the matching RAM 134 and object memory 200 preferentially at younger addresses.

In the system of the first embodiment, all the data of an object to be displayed on one horizontal line are first written in the line buffer memory 420 and object memory 200. Secondly, the object data stored in the object memory 200 are read out by one pixel at a time by the readout circuit 500, based on the matching number for one horizontal scan line which has been stored in the line buffer memory 420.

(f) Readout Circuit

The readout circuit 500 comprises a selector 510 and a counter control section 511 for controlling counter 410.

On writing data in the object memory 200, the readout circuit 500 is adapted to output a matching number from a latch circuit 840 toward the object memory 200 as a write address.

On reading data, the readout circuit 500 first controls the line buffer counter 410 by the use of the counter control section 511. The readout circuit 500 then causes the counter 410 to output readout addresses incremented from "0" to "287" in synchronism with the horizontal scan, toward the line buffer memory 420.

Thus, the line buffer memory 420 will sequentially output the data stored at the addresses "0" through "287" through the selector 510 as readout addresses for the object memory 200.

At the same time, the readout addresses outputted from the line buffer counter 410 are applied to the address converting circuit 600 through a selector 850. The data of each of the objects read out from the object memory 200 also are supplied to the address converting circuit 600.

In the first embodiment, the system may comprise two combinations each consisting of a line buffer 400 and an object memory 200. The system is of a dual-function type wherein when the writing is being made to one combination, the reading will be made from the other combination.

As shown in FIG. 8, the system of the first embodiment is provided with two matching circuits 130-1 and 130-2 which are related by two combinations each consisting of the line buffer 400 and the object memory 200 to read out the data.

In other words, the matching counter 132 in one of the matching circuits 130-1 initiates its up-counting operation based on the matching signals at the same time as a horizontal scan leading, by two, a horizontal scan line to be displayed is initiated.

As the next horizontal scan is initiated, the matching counter 132 also initiates its down-counting operation to perform the writing of data to the matching RAM 134 and also to output signals toward the object memory 200 and line buffer RAM 420 due to the matching numbers outputted.

Based on the matching number outputted from the matching counter 132 in the matching circuit 130-1, a matching number is applied to one combination of the line buffer RAM 420 with the object memory 200. Thus, data are written in the line buffer 400 and the object memory 200. At this time, the other matching circuit 130-2 initiates to prepare the matching counter 132 to calculate data to be displayed on the next third horizontal scan line. Namely, the matching counter 132 in the matching circuit 130-2 initiates its up-counting operation.

At this time, in the other combination of the line buffer RAM 420 with the object memory 200 provided for the matching circuit 132-2, data to be displayed on a horizontal line being presently scanned are being read out.

Since such a procedure is alternately performed by two combinations each consisting of the matching circuit, line buffer RAM and object memory 200, data to be displayed on each of the horizontal scan lines can be written or read out smoothly.

(g) Address Converting Circuit

The address converting circuit 600 comprises two adders 610 and 620.

One of the adders 610 is adapted to subtract the counts of the line buffer counter 410 inputted thereto through the selector 850 from the horizontal display position signal read out from the object memory 200. The result is outputted from the adder 610 as five-bit subtracted value.

The five-bit subtracted value is representative of the position of the horizontal scan being presently performed relative to the corresponding pixel measured from the left-hand end of an object to be displayed thereon. Where a plurality of objects are combined to display a larger composite object as shown in FIG. 3, two high-order bits in this five-bit data defines horizontal character block data representing the number of an object measured from the left-hand end of the aforementioned composite object. Three low-order bits are H-Dot data (dot number) which represents the number of a pixel measured from the left-hand end of that character block.

The other adder 620 functions to add the column character code of an object read out from the object memory 200 to two high-order bits of the five-bit subtracted value which has been outputted from the adder 610, such that the column character code CCL to be displayed therein can be calculated and outputted therefrom.

The 10-bit signal outputted from the address converting circuit 600 is representative of ten high-order bits in the object identification data, that is, a line character code. The signal CCL outputted from the adder 610 is representative of six low-order bits in the object identification data, that is, a column character code. Three low-order bits in the five-bit subtracted value from the adder 610 is a dot number representative of the number of a pixel measured from the left-hand end of the object while the signal LINE is representative of a vertical in-block scan position signal (line number).

Figure 12:
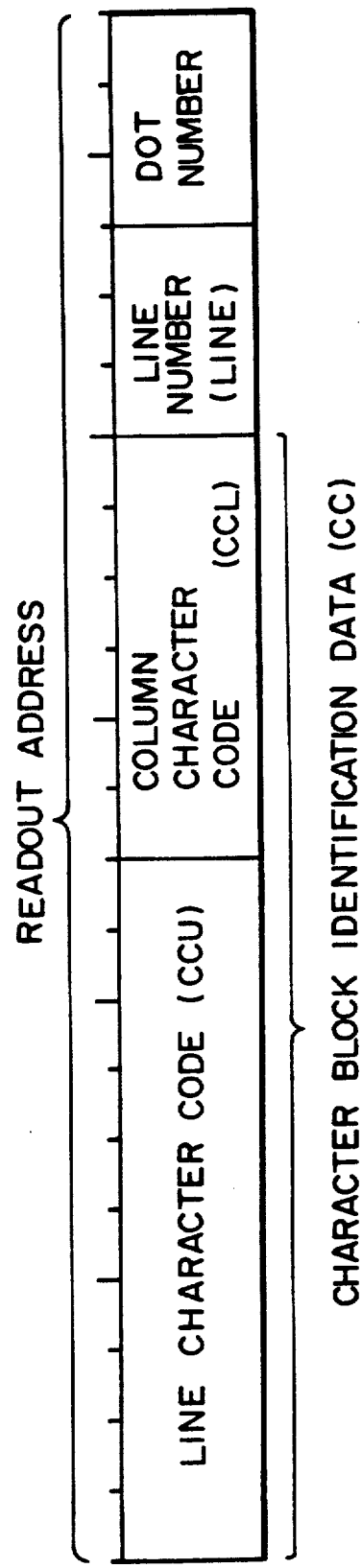
FIG. 12 illustrates the arrangement of a readout address usable in the character generator shown in FIG. 11.

Thus, the address converting circuit 600 will output readout addresses used for the character generator shown in FIG. 12. The additional data (including priority data, pallet data and so on) of that object read out from the object memory 200 are outputted, together with the readout addresses just mentioned, toward the multiplexer 70 (FIG. 1).

The multiplexer 70 compares such inputted data with data applied thereto from the other circuits such as scene scrolling circuit and so on. If the data from the address converting circuit 600 has its higher priority, these data including the readout addresses and additional data are applied to the character generator 40.

As the character generator 40 receives such data sequentially, it outputs pixel data specified by the readout addresses from the character generator, which pixel data in turn are supplied to a color signal circuit, together with said additional data.

The color signal circuit is adapted to output a color signal on CRT for one pixel, based on the inputted pixel data and additional data.

By outputting the color signal for one pixel in synchronism with each horizontal scan, the system of the first embodiment can image objects calculated by the object controller 10 for one scene on the CRT.

Although the present invention has been described as to the video game, the present invention will not be limited to the video game and can be applied to other applications such as an image display circuit in a personal computer.

COMPARISON OF THE INVENTION WITH THE PRIOR ART

The object display system according to the present invention will be compared with that of the prior art with reference to storage capacity.

Prior to the comparison, it is assumed that one horizontal scan line on the CRT is defined by 288 pixels and that data for each object include eight-bit pixel data, five-bit pallet data and three-bit priority data.

Figure 15:
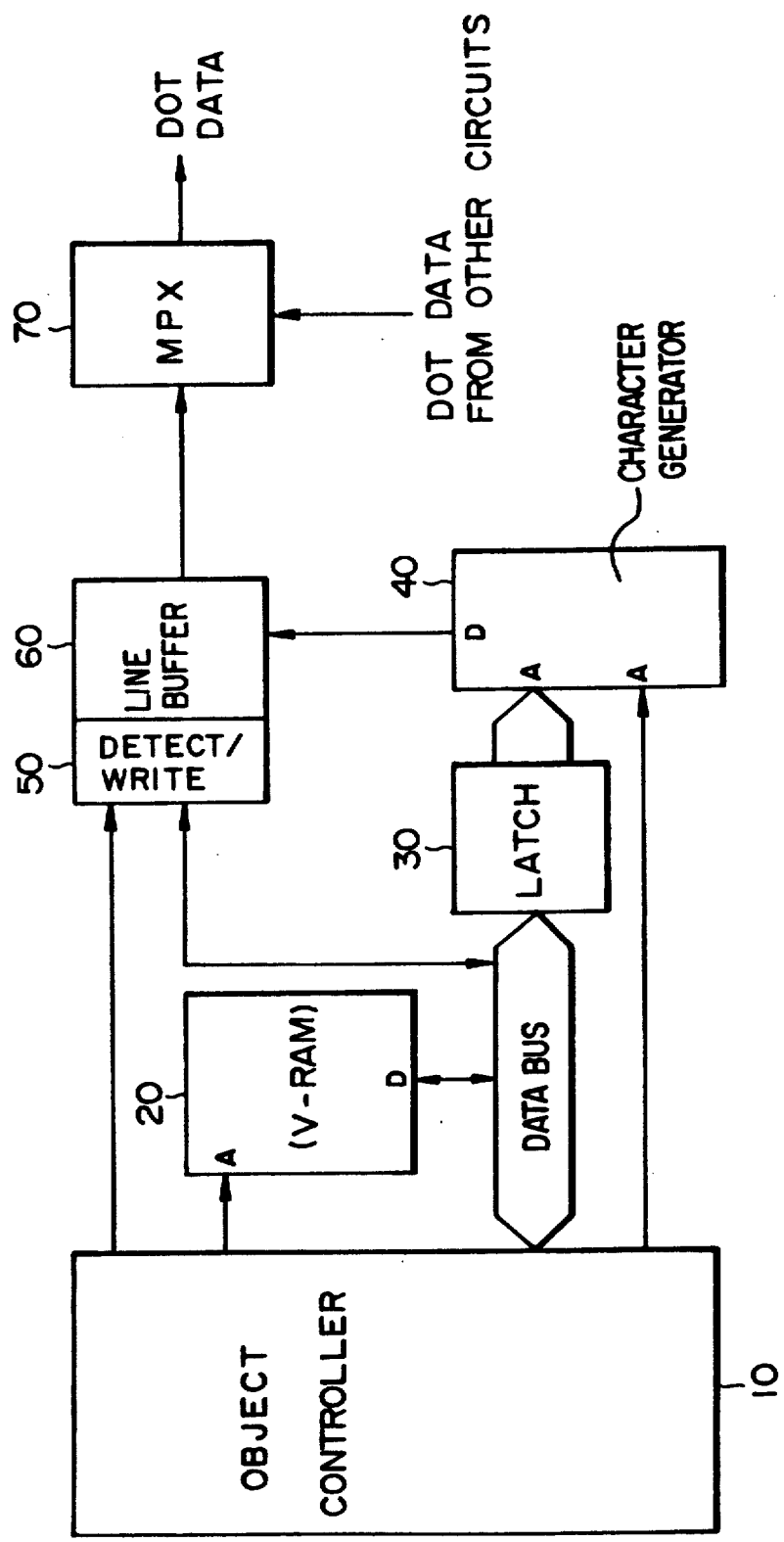
FIG. 15 is a block diagram exemplifying one of the conventional object display systems.
Figure 17:
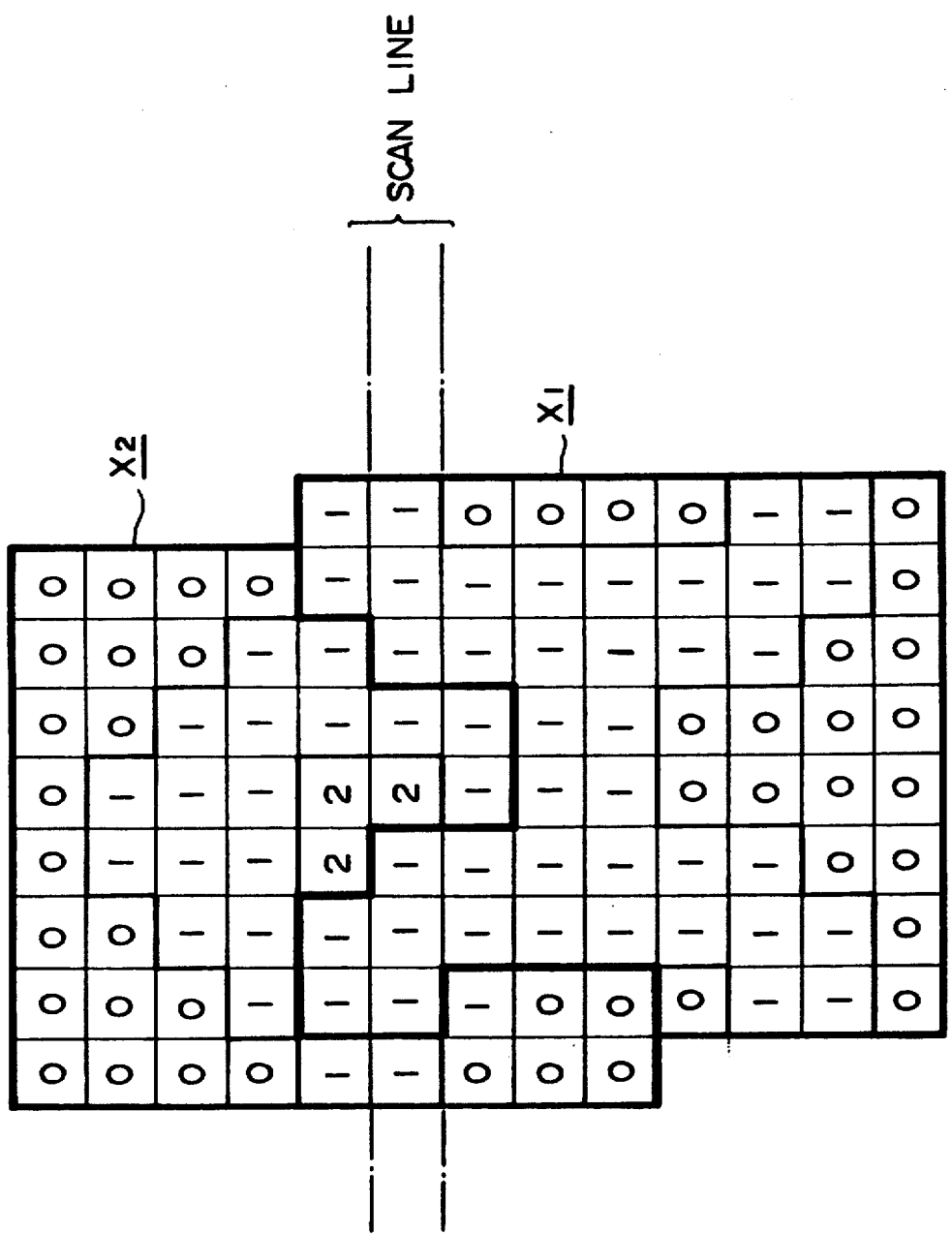
FIG. 17 illustrates a composite object displayed by superimposing a plurality of objects.
Figure 18A:
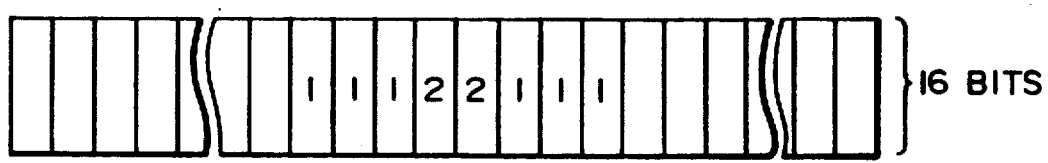
FIGS. 18A, 18B and 18C illustrate data written in the line buffer of the conventional system shown in FIG. 15 when the composite object is displayed as shown in FIG. 17.
Figure 18B:
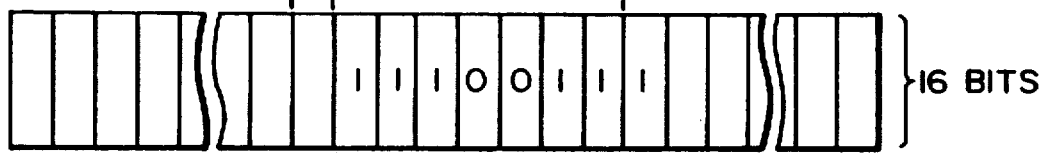
Figure 18C:
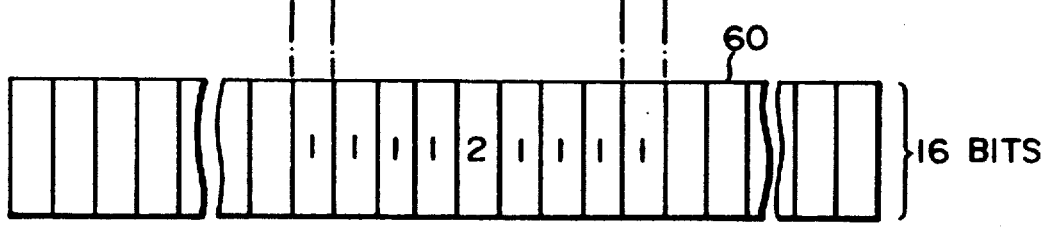

In such a case, the prior art system shown in FIG. 15 requires a line buffer 60 having its storage capacity defined by:

16 (bits/pixel)×288 (pixels)=4608 (bits).

On the other hand, the present invention can display a composite object formed by a maximum of 31 objects (capable of being represented by five bits) on one horizontal scan line only by the use of a line buffer 400 having its storage capacity equal to:

5 (bits/pixel)×288 (pixels)=1440 (bits).

Although the present invention requires the object memory 200 in addition to the line buffer 400, the object memory 200 only requires its storage capacity:

32 (bits)×31=992 (bits)

to display a maximum of 31 objects on one horizontal scan line.

The matching RAM 134 used in the first embodiment only requires its storage capacity:

14 (bits)×31=434 (bits).

Therefore, the total storage capacity of the system according to the present invention may be:

1440 (bits)+434 (bits)+992 (bits)=2866 (bits).

When the system of the present invention is simply compared with the prior art system, it is found that the storage capacity of the present invention may be smaller than that of the prior art by:

4608 (bits)−2866 (bits)=1742 (bits).

This means that the total storage capacity of the present invention is equal to about 3/5 times that of the prior art, which is reduced sharply from the total storage capacity of the prior art.

If the present invention is applied to a dual-line buffer type system, the storage capacity thereof can be reduced by:

1742 (bits)×2=3484 (bits).

There is a tendency that the amount of object data such as pixel data is further increased in future. This means that the capacity of RAM can increase by one horizontal scan, that is, 288 bits on each increase of one bit.

On the other hand, the system of the present invention is very advantageous over the prior art in that even if the amount of object data increases, the capacity of the RAM used in the present invention will not substantially increase.

SECOND EMBODIMENT

The second preferred embodiment of the present invention will now be described. Parts similar to those of the first embodiment are denoted by similar reference numerals and the further description thereof will be omitted herein.

Figure 13:
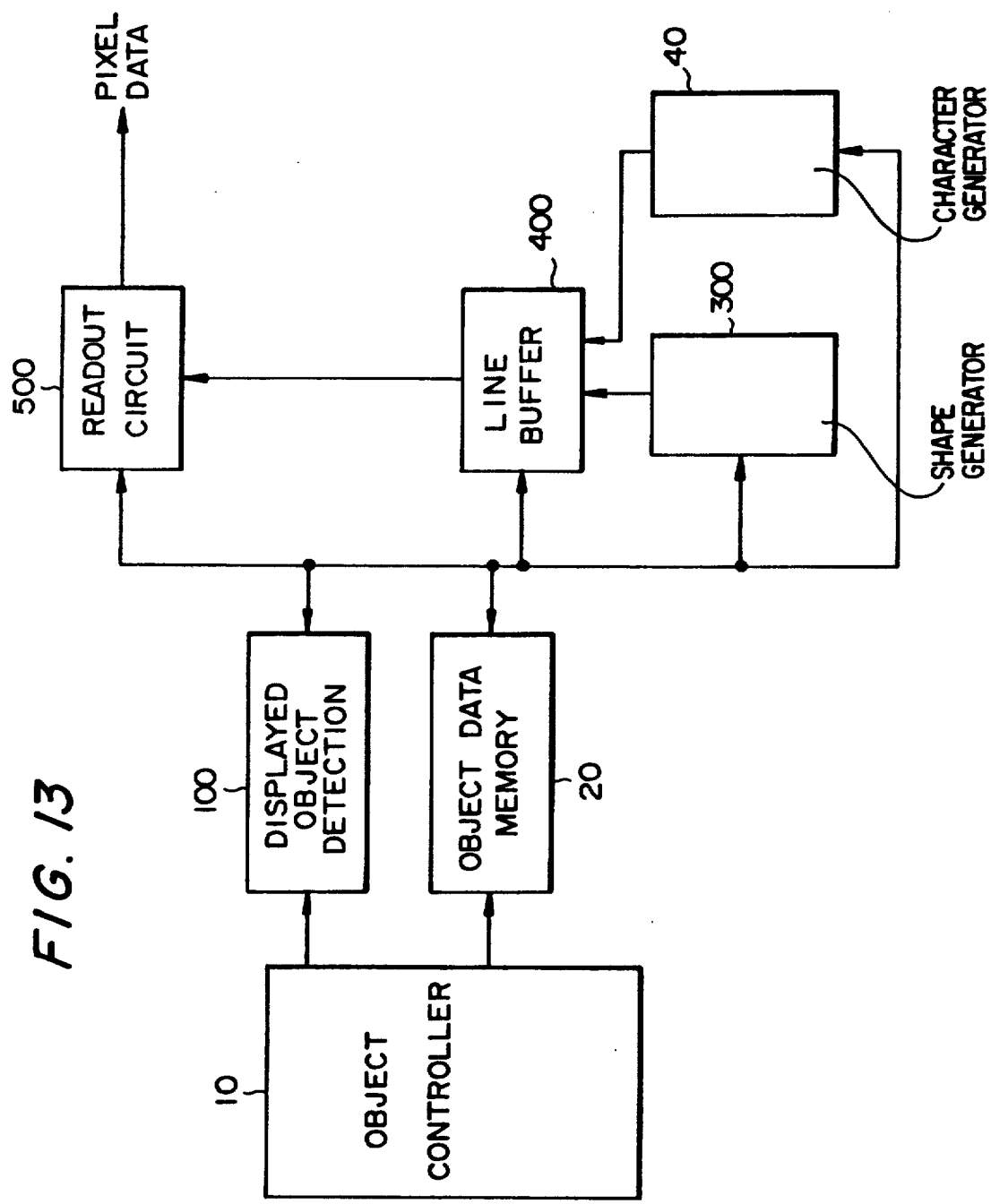
FIG. 13 is a block diagram of another embodiment of an object display system constructed according to the present invention.

Referring to FIG. 13, there is shown the second preferred embodiment of an object display system according to the present invention, which is characterized by color codes being written and stored directly in the line buffer 400 without use of the object memory 200 as in the first embodiment.

First of all, the object detecting circuit 100 detects an object to be displayed on a horizontal scan line to be calculated in synchronism with the horizontal scan. Data of each of the detected objects are read out from the object data memory 20 and then supplied to the line buffer 400, shape generator 300 and character generator 40.

At this time, the shape generator 300 receives such a detected object reading address as shown in FIG. 7. At the same time, the character generator 40 receives such a detected object reading address as shown in FIG. 12.

As in the first embodiment, the shape generator 300 applies binary pixel data for one horizontal scan within the block of the detected object to the line buffer 400 as transparent/opaque data for each pixel. The binary pixel data are used as a write address for the line buffer 400.

The character generator 40 supplies color codes for one horizontal scan within the block of the detected object to the line buffer 400 for each of the pixels.

The line buffer 400 then judges whether a storage area for each of the pixels corresponding to the display position of each of the detected objects is transparent or opaque based on the output of the shape generator 300. If it is judged that storage area is opaque, a color code of each of the detected objects, outputted from the character generator 40 is stored at the same storage area.

In such manner, the color code for one horizontal scan is sequentially written in the line buffer 400 at the corresponding storage area.

On writing, the system of the second embodiment performs such a judgement based on the binary pixel data which are outputted from the shape generator 300. Thus, the judgement can be accomplished by less data, compared with a case where the judgement is achieved by the use of color codes. And yet, the entire system can be simplified with reduced cost.

After the color codes of the objects to be displayed on the corresponding horizontal scan line have been written in the line buffer 400, the readout circuit 500 then operates to read color code data for one horizontal scan stored in the line buffer 400 and sequentially to output them as pixel data.

Since the color codes themselves are written in the line buffer 400 in the second embodiment, data outputted from the line buffer 400 are representative of pixel data themselves on the object. The pixel data can be outputted from the readout circuit 500 without provision of the address converting circuit 600 and character generator 40 on the last-half stage of the readout circuit 500.

Although the second embodiment of the present invention has been described as to the fact that the color codes are written in the line buffer 400, the present invention will not be limited to such an arrangement and may be applied to any other line buffer in which the other and necessary data may be written and stored in addition to the color codes.

CONCRETE EXAMPLE

Figure 14B:
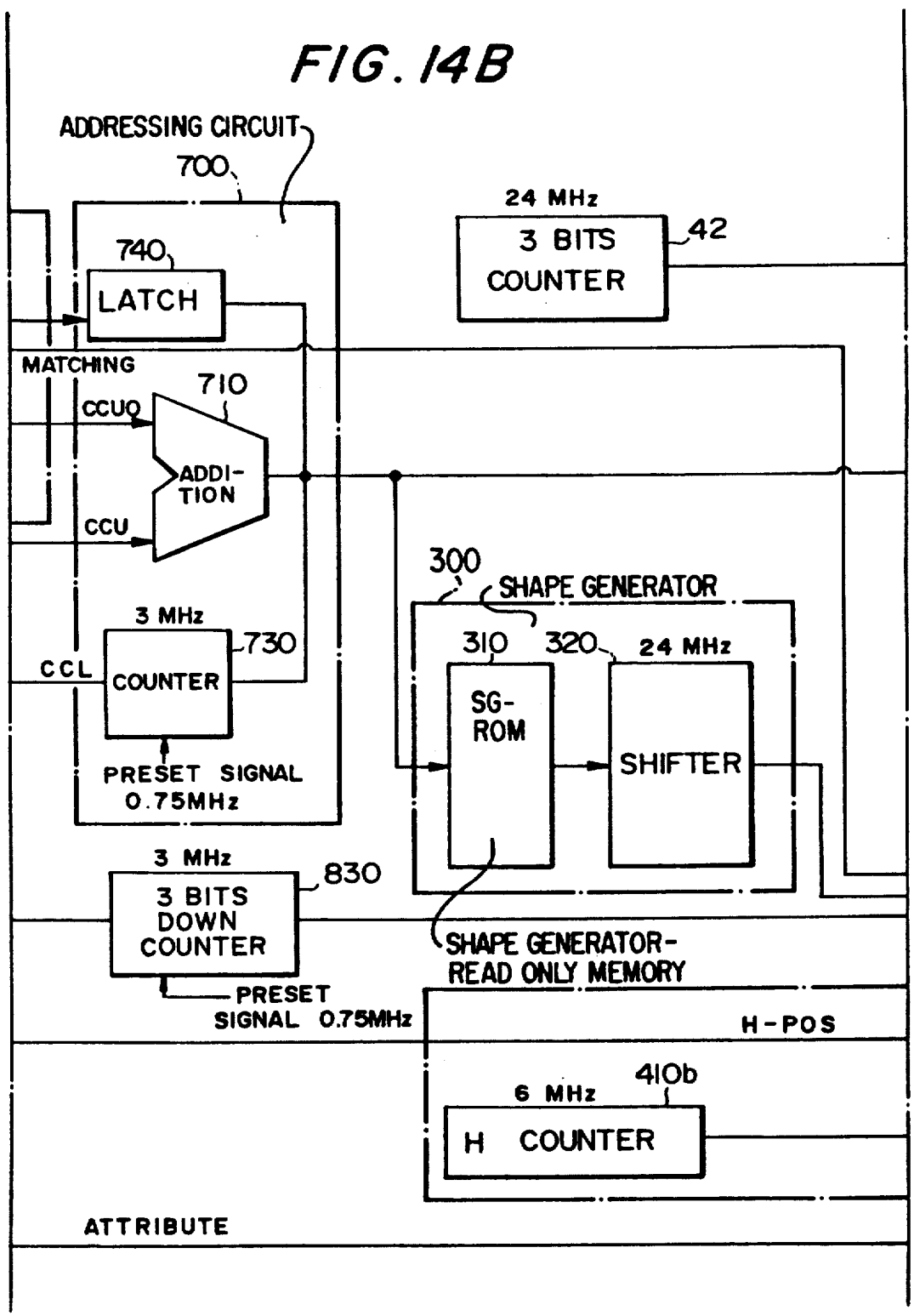
Figure 14C:
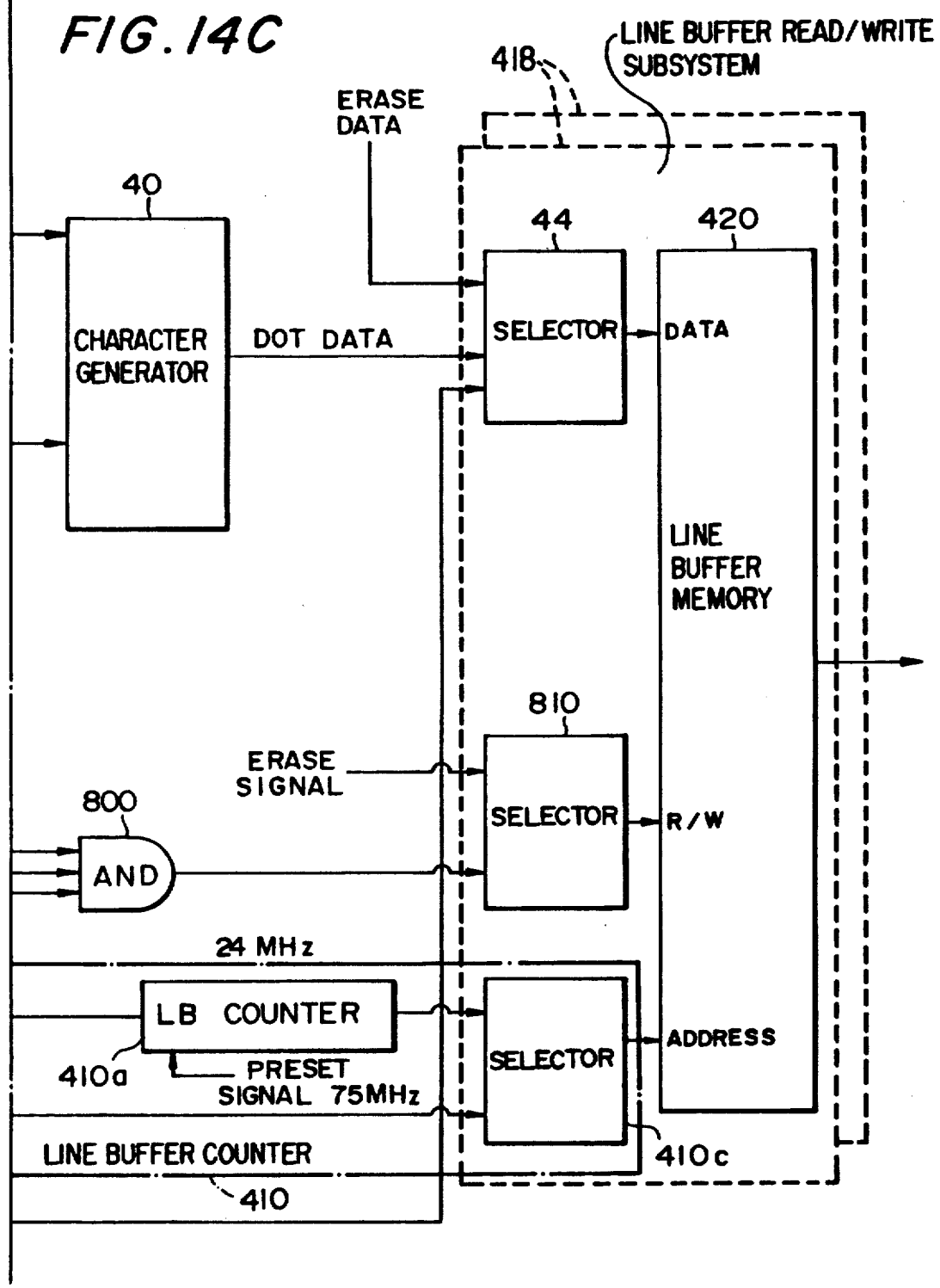

FIG. 14 shows the concrete configuration of a circuit usable in the second embodiment of FIG. 13. In FIG. 14, parts similar to those of the embodiment shown in FIGS. 8 and 9 are designated by similar reference numerals and the further description thereof will be omitted herein.

The object counter 110 is adapted to output a readout address of each object to the object data memory 20 for each horizontal scan in synchronism with a clock of 3 MHz.

Therefore, the object data of each object will be sequentially outputted from the object data memory 20 in synchronism with the cycle of 3 MHz by which the readout address is inputted in the object data memory 20.

At this time, the object data of each object outputted from the object data memory 20 include data $D_1$ in which two low-order bits in the readout address are stored at a region "00", data $D_2$ in which the two low-order bits are stored at a region "01", data $D_3$ in which the two low-order bits are stored at a region "10" and data $D_4$ in which the two low-order bits are stored at a region "11". The data $D_1$ are inputted into the matching signal generating circuit 120 through the latch 106.

As in the first embodiment, the matching signal generating circuit 120 is adapted to calculate and output the matching signal, the vertical in-block scan position signal (LINE) and the vertical character block (CCUO).

The data $D_2$ outputted from the object data memory 20 are inputted into the addressing circuit 700 through the latch circuit 75.

The addressing circuit 700 calculates character block identification data used to specify an object display block, based on the data $D_2$ and the data outputted from the matching signal generating circuit 120, and outputs the calculated character block identification data toward the character and shape generators 40 and 300.

The addressing circuit 700 comprises a counter 730 which is adapted to count clocks of 3 MHz starting from an initial signal CCL inputted therein at each time when a reset signal is inputted. The frequency of the clocks (3 MHz) is equal to that of clocks from said object counter 110. Each of the reset signals is generated at an interval of 0.75 MHz. Thus, the counter 730 will output line character codes corresponding to a maximum of four blocks.

In such a manner, the addressing circuit 700 will cause the adder 710 to output line character codes, the counter 730 to output column character codes and the latch circuit 740 to output line numbers, respectively. Such output data are representative of readout addresses in the shape generator 300 shown in FIG. 7.

The character generator 40 receives a counted value obtained in the three-bit counter 42 by counting up clocks of 24 MHz therein, as a dot number. The clock frequency of 24 MHz is eight times the clock frequency of 3 MHz in the object counter 110. At each time when the data of an object is read out from the object data memory 20, eight-dot data will be read out from the character generator 40. In order to access the character generator 40 at 24 MHz, a high-speed RAM may be used herein. However, a low-speed ROM may be used by performing alternate access to two character generators.

In such a manner, the character generator 40 will receive readout addresses for the character generator shown in FIG. 12 from the addressing circuit 700 and three-bit counter 42.

Based on such readout addresses, the data outputted from the shape and character generators 300 and 40 are respectively inputted in the line buffer memory 420 through the selectors 810 and 44.

At this time, the output of the shape generator 300 through the selector 810 becomes a write signal. In the second embodiment, such a write signal is inputted in the selector 810 through an AND gate 800. The AND gate 800 is adapted to receive matching signals from the matching signal generating circuit 120 and signals from the three-bit counter 830 in addition to the signals from the shape generator 300.

If there is no matching signal, the writing to the line buffer memory 420 is not permitted. This is true for where no high-level signal is outputted from the three-bit counter 830.

At this time, the output of the character generator 40 inputted thereto through the selector 44, that is, a color code for each pixel becomes a write data to the line buffer memory 420.

The data $D_4$ outputted from the object data memory 20 also is inputted into the selector 44 through the latch circuit 46, as write data.

In such a manner, the system of the second embodiment is such that color codes and additional data outputted from the object data memory 20 are inputted into the line buffer memory 420, as write data.

Write addresses relating to such data are inputted from a line buffer counter 410, which will be described later, to the line buffer memory 420.

Among the data $D_3$ outputted from the object data memory 20, a horizontal size H-SIZE is inputted into the three-bit counter 830 through the latch circuit 820. A horizontal display position included in the data $D_3$ is inputted into the line buffer counter 410 through the latch circuit 440.

At each time when a preset signal is inputted into the three-bit counter 830 at the frequency of 0.75 MHz, the latter presets one high-order bit at "1" and also H-SIZE signal (two bits) inputted thereinto from the latch circuit 820 at two low-order bits. This preset value of three bits as an initial value is then counted down under the clock frequency of 3 MHz. One high-order bit in the counted value is outputted therefrom toward the AND gate 800.

The line buffer counter 410 comprises a line buffer counter 410a, an H-counter 410b and a selector 410c.

The line buffer counter 410a is used for outputting a data writing address to the line buffer memory 420. At each time when a preset signal is inputted in the line buffer counter 410a at the frequency of 0.75 MHz, the line buffer counter 410a performs its counting-up operation at the clock frequency of 24 MHz, starting a horizontal size outputted from the latch circuit 440 at that time. The resulting counts are outputted toward the line buffer memory 420 through the selector 410c, as write addresses. The reason why the clock frequency is set to be equal to 24 MHz is because it is wanted to output write addresses at the same timing as that of the dot-data output cycle in the character generator 40.

At the respective storage areas in the line buffer memory 420, specified by these addresses, therefore, the outputs of the character generator 40 inputted through the selector 44 (color codes) and the outputs of the latch circuit 46 (data $D_4$) will be written and stored only when write signals from the selector 810 are inputted in the line buffer memory 420.

The H-counter 410b is used to read data from the line buffer 420. In other words, the H-counter 410b is adapted to count clocks of 6 MHz from "0" to "287". The counted value is outputted toward the line buffer memory 420 through the selector 410c, as a write address.

Accordingly, as a write address is inputted from the H-counter 410b to the line buffer memory 420, the addresses from "0" to "287" will be read out from the line buffer memory 420 sequentially in synchronism with the horizontal scan on the CRT.

The selectors 44, 810 and 410c are alternately switched from one to another in synchronism with the data writing and reading timings relative to the line buffer memory 420.

In the second embodiment, there are provided two line buffer read/write subsystems 418, each having a line buffer memory 420. During the writing of data to one of the line buffer memories, data may be read out from the other line buffer memory 420.

In that line buffer memory into which the data are written, the selector 44 is set to select the outputs of the character generator and latch 46 while the selector 810 is controlled to select the output of the AND gate 800 and selector 410c to choose the output of the line buffer counter 410a.

For the line buffer memory from which the data are read out, the selector 410c is set to select the output of the H-counter 410b while at the same time the other selectors 810 and 44 are set to select erase signals and erase data.

If data are read out from the line buffer memory 420, then, data stored at pixel being read out are succeedingly erased to perform a so-called "read-modifying-write" operation.

It is to be understood that the present invention will not be limited to the first and second embodiment thereof illustrated and described above. Various modifications and changes may be carried out without departing from the scope of the invention.

As will be apparent from the foregoing, both the first and second embodiments of the present invention can overcome the first mentioned problem in the prior art and provide a simplified and inexpensive system which can utilize less data required to make the judgement at higher speeds.

In addition, the first embodiment of the present invention can overcome the second and third mentioned problems in the prior art and an inexpensive system which includes line buffer means custom-chipped if required and which can use a line buffer having its reduced capacity at all times independently of increase or decrease of data representative of objects to be displayed.

We claim:

1. An object display system for displaying an object using a set of object data including object identification data, vertical display position data and horizontal display position data for each object to be displayed, said object display system comprising:

a raster display for displaying an image of the object;

an object data memory for storing the object data corresponding to one scene;

an object detecting circuit for detecting the object to be displayed on each of horizontal scan lines in the raster display in synchronism with said horizontal scan lines based on the object data stored in said object data memory, said object detecting circuit reading the object data of each detected object from said object data memory, calculating and outputting a vertical in-block scan position of the detected object;

a shape generator pre-registered with the image of each object as block information represented by binary pixel data which are representative of transparent and opaque sections of the image, said shape generator outputting the binary pixel data corresponding to one horizontal scan in the block of the object as transparent or opaque data for each pixel based on the object identification data of each object read out and the calculated vertical in-block scan position data;

an object memory for storing the object data of each object detected and read out from the object data memory by said object detecting circuit sequentially in predetermined storage areas;

a line buffer counter being responsive to the object data of each of the detected objects from said object data memory, said line buffer counter using a write start address specified by the horizontal display position data included in said object data, starting to count the number of pixels corresponding to the horizontal size of the object from said write start address sequentially, outputting said count number sequentially as a write address signal;

a line buffer memory having storage areas corresponding to pixels for one horizontal scan, said buffer memory using each of the binary pixel data outputted from said shape generator as a write signal to allow to store data into said storage areas corresponding to opaque pixels so that the write address of the detected object for said object memory are sequentially stored into storage areas specified by the write address signals from said line buffer counter and corresponding to the opaque sections of the image;

a readout circuit for reading the information of an object to be displayed on one horizontal scan line from said object memory for each dot in synchronism with the horizontal scan, based on the address data corresponding to one horizontal scan line stored in said line buffer memory; and a character generator pre-registered with the image of each object as block information specifying a color of said image by a color code for each pixel, said character generator being adapted to output the color code of the corresponding object for each pixel, based on the information of object read out from said object memory for each dot to produce pixel data for said raster display.

2. An object display system as defined in claim 1 wherein said object identification data includes line character codes and column character codes and wherein said shape and character generators are adapted to specify the block information from said column character and line character codes.

3. An object display system as defined in claim 2 wherein said set of object data including object identification data, vertical display position data, and horizontal display position data, further include vertical size data and horizontal size data such that a larger object can be displayed having its image spanning one or more vertical and horizontal blocks and wherein said shape and character generators are adapted to register an object which has its image displayed spanning one or more vertical and horizontal blocks and specified by said object identification data, vertical size data and horizontal size data.

4. An object display system as defined in claim 2 wherein said object detecting circuit comprises:

an object counter for outputting the readout addresses of all the objects toward said object data memory for each horizontal scan and for reading the vertical display position data of each object from said object data memory;

a matching signal generating circuit for judging whether or not each of the read objects can be displayed on a horizontal scan line, based on the vertical display position data of that object and the vertical scan position of the same on the raster display and for generating a matching signal at its output if it is judged that said object can be displayed on the horizontal scan line while at the same time the vertical in-block scan position of said object is calculated and outputted;

a matching counter for counting the number of said matching signals in one direction to output a matching number; and a matching RAM for sequentially storing the readout address of the corresponding object from said object data memory and the vertical in-block scan position data of the same object at a storage area specified by said matching number at each time when a matching signal is outputted;

said matching counter being adapted to perform the counting in the opposite direction after the object to be displayed on one horizontal scan line has been detected;

said matching RAM being adapted to output, to said object data memory, the readout address of an object read out when the matching number counted in the opposite direction and outputted by said matching counter is inputted in said matching RAM as a readout address and to cause said object data memory to output the object data therefrom while at the same time outputting the vertical in-block scan position data of the read object toward said shape generator and said object memory.

5. An object display system as defined in claim 4 wherein said shape generator comprises:

a shape memory pre-registered with the image of each object as block information represented by binary pixel data which are representative of transparent and opaque sections in the image, said shape memory being adapted to output the binary pixel data for one horizontal scan in the block of the corresponding object as parallel data, based on the object identification data and vertical in-block scan position data; and a shifter for converting said output parallel data into serial data for each pixel;

said object memory being adapted to store the object information of each of the objects outputted from said object data memory at a storage area specified by the matching number counted in the opposite direction and outputted by said matching counter;

said line buffer memory being adapted to be responsive to the horizontal display position data of an object read out from said object data memory and the transparent and opaque data of a pixel line outputted from said shape generator to store the matching number counted in the opposite direction and outputted by the matching counter for that object at a storage area corresponding to each of the pixels used to display said object.

6. An object display system as defined in claim 3 wherein said object detecting circuit comprises:

an object counter for outputting the readout addresses of all the objects to said object data memory for each horizontal scan and for reading the vertical display position data and vertical size data of each of the objects from said object data memory;

a matching signal generating circuit responsive to the vertical display position data and vertical size data of each of the read-out objects and the vertical scan position of the same object on the raster display to judge whether or not that object can be displayed on the corresponding horizontal line, said matching signal generating circuit being adapted to output a matching signal if it is judged that said object can be displayed on the horizontal scan line and also to calculate and output a vertical character block specifying the character block which defines said object and the vertical in-block scan position;

a matching counter for counting the number of said matching signals in one direction to produce an output count signals as a matching number; and a matching RAM for sequentially storing a set of data including readout addresses from said object counter, vertical character blocks from said matching signal generating circuit and vertical in-block scan position data at a storage area specified by said matching number at each time when a matching signal is outputted;

said matching counter being adapted to count and output the count in the opposite direction after the object to be displayed on one horizontal scan line has been detected;

said matching RAM being adapted to output a readout address included in a set of data to said object data memory, said set of data being read out when the matching number counted in the opposite direction and outputted by said matching counter is inputted in said matching RAM as a readout address, said readout address causing said object data memory to output the object data of the object, said matching RAM being also adapted to output the vertical character block and vertical in-block scan position data of the object included in said set of readout data to said shaped generator and object memory.

7. An object display system as defined in claim 6, further comprising an addressing circuit responsive to the object identification data read from said object data memory, the vertical character block data outputted from said matching RAM and the vertical in-block scan position data to provide readout address data to said shape generator for displaying the image of a given object, said readout address data including the line character and column character codes specifying one of a plurality of character blocks combined with one another in the vertical and horizontal directions and the vertical in-block scan position.

8. An object display system as defined in claim 4 wherein said object memory is adapted to sequentially store the information of each of the objects read out from said object data memory at a storage area specified by the matching number of said matching counter counted in the opposite direction, in accordance with the object readout address outputted from said matching RAM.

9. An object display system as defined in claim 7 wherein said object memory is adapted to store the line character and column character codes and vertical in-block scan position data of an object outputted from said addressing circuit at a storage area specified by the matching number of said matching counter counted in the opposite direction and to sequentially store the data from said object data memory except the line character code, column character code and vertical in-block scan position data, in accordance with the object readout address outputted from said matching RAM.

10. An object display system as defined in claim 4, wherein said line buffer memory is adapted to store write addresses represented by the matching numbers outputted from said matching counter sequentially as write data in synchronism with the horizontal scan signal.

11. An object display system as defined in claim wherein said line buffer memory is adapted to write the matching numbers outputted from said matching counter into the storage areas of said line buffer memory specified by write addresses from said line buffer counter sequentially in synchronism with the horizontal scan, so that the write addresses of the object detected by the object detecting circuit for said object memory can be sequentially stored in said line buffer memory.

12. An object display system as defined in claim 1, further comprising an address converting circuit located between said object memory and said character generator, said address converting circuit being adapted to convert the object data read out from said object memory for each dot into a data readout address for said character generator.

13. An object display system for using a set of object data including object identification data, vertical display position data and horizontal display position data for each object to be displayed, said object display system comprising:

a raster display for displaying an image of the object;

an object data memory for storing the object data corresponding to one scene;

an object detecting circuit for detecting the object to be displayed on each of horizontal scan lines in the raster display in synchronism with said horizontal scan lines based on the object data stored in said object data memory, said object detecting circuit reading the object data of each detected object from said object data memory, calculating and outputting a vertical in-block scan position of the object;

a shape generator pre-registered with an image of each object as block information represented by binary pixel data which are representative of transparent and opaque sections of the image, said shape generator outputting the binary pixel data corresponding to one horizontal scan in the block of the object transparent or opaque data for each pixel based on the object identification data and the calculated vertical in-block scan position data;

a character generator pre-registered with image data of each object on its shape and color as block information using color codes to specify a color for each pixel, said character generator being also adapted to output the color code data corresponding to one horizontal scan in the block of the corresponding object for each pixel based on the object identification data of each object read out and the calculated vertical in-block scan position data;

a line buffer counter being responsive to the object data of each of the detected objects from said object data memory, said line buffer counter using a write start address specified by the horizontal display position data included in said object data, starting to count the number of pixels corresponding to the horizontal size of the object from said write start address sequentially, outputting said count number sequentially as a write address signal;

a line buffer memory having storage areas corresponding to pixels for one horizontal scan, said buffer memory using each of the binary pixel data outputted from said shape generator as a write signal to allow to store data into said storage areas corresponding to opaque pixel so that color codes outputted from said character generator are sequentially stored into storage areas specified by the write address signal from said line buffer counter and corresponding to the opaque sections of the image; and the information of one horizontal scan stored in said line buffer memory in synchronism with the horizontal scan being read out and outputted as pixel information to said raster display.

14. An object display system as defined in claim 13 wherein said object identification data include line character codes and column character codes and wherein said shape and character generators are adapted to specify data for each block by the use of said line character and column character codes.

15. An object display system as defined in claim 14 wherein said set of object data including object identification data, vertical display position data, and horizontal display position data, further includes vertical size data and horizontal size data such that the image of a large object can be displayed spanning one or more blocks in the vertical and horizontal directions and wherein said shape and character generators are adapted to register objects each of which has its image capable of being displayed spanning one or more blocks in the vertical and horizontal directions and is specified by said object identification data, vertical size data and horizontal size data.

* * * * *